United States Patent
Sawamura et al.

(10) Patent No.: US 7,069,043 B2
(45) Date of Patent: Jun. 27, 2006

(54) WIRELESS COMMUNICATION DEVICE WITH TWO INTERNAL ANTENNAS

(75) Inventors: Masatoshi Sawamura, Saitama (JP); Yoshiki Kanayama, Saitama (JP)

(73) Assignee: Sony Corporation (JP)

( * ) Notice: Subject to any disclaimer, the term of this patent is extended or adjusted under 35 U.S.C. 154(b) by 559 days.

(21) Appl. No.: 10/343,268

(22) PCT Filed: Jun. 5, 2002

(86) PCT No.: PCT/JP02/05530

§ 371 (c)(1),
(2), (4) Date: Jan. 27, 2003

(87) PCT Pub. No.: WO02/099927

PCT Pub. Date: Dec. 12, 2002

(65) Prior Publication Data

US 2003/0148784 A1    Aug. 7, 2003

(30) Foreign Application Priority Data

Jun. 5, 2001   (JP) .............................. 2001-170050

(51) Int. Cl.
*H04M 1/00* (2006.01)

(52) U.S. Cl. .................. 455/550.1; 455/13.3; 455/121; 455/575.7; 455/25; 455/63.4; 455/129; 455/575.5

(58) Field of Classification Search ............ 455/550.1, 455/575.7, 575.5, 121, 82, 83, 13.3, 19, 25, 455/63.4, 97, 129, 193.1, 279.1; 379/279.1; 343/700 R
See application file for complete search history.

(56) References Cited

U.S. PATENT DOCUMENTS

| | | | |
|---|---|---|---|
| 4,057,758 A * | 11/1977 | Hattori et al. | 375/267 |
| 5,542,106 A * | 7/1996 | Krenz et al. | 455/575.7 |
| 6,067,449 A * | 5/2000 | Jager | 455/277.2 |
| 6,278,873 B1 | 8/2001 | Itakura et al. | 455/351 |
| 6,405,061 B1 * | 6/2002 | Bae | 455/566 |
| 6,456,247 B1 * | 9/2002 | Hulick et al. | 343/702 |
| 6,549,789 B1 * | 4/2003 | Kfoury | 455/550.1 |
| 2004/0106428 A1 * | 6/2004 | Shoji | 455/550.1 |

FOREIGN PATENT DOCUMENTS

| | | |
|---|---|---|
| JP | 09247031 | 9/1997 |
| JP | 11187096 | 7/1999 |
| JP | 2000284854 | 10/2000 |

* cited by examiner

*Primary Examiner*—Nay Maung
*Assistant Examiner*—Shaima Q. Aminzay
(74) *Attorney, Agent, or Firm*—Lerner, David, Littenberg, Krumholz & Mentlik, LLP

(57) ABSTRACT

A portable wireless communication terminal device has a data communications function and a telephone function and includes a casing, a display having a display section exposed through an opening of the casing, a circuit board installed in the casing and having the display on one surface of the circuit board, a first antenna electrically connected to the circuit board and disposed on an opposite side to the display inside the casing, and a second antenna electrically connected to the circuit board and mounted on a periphery of the display inside the casing. The device maintains a stable antenna characteristic and communication quality even if it is placed on a table or if the fingers of a user cover the backside of the device.

16 Claims, 17 Drawing Sheets

FIG. 1
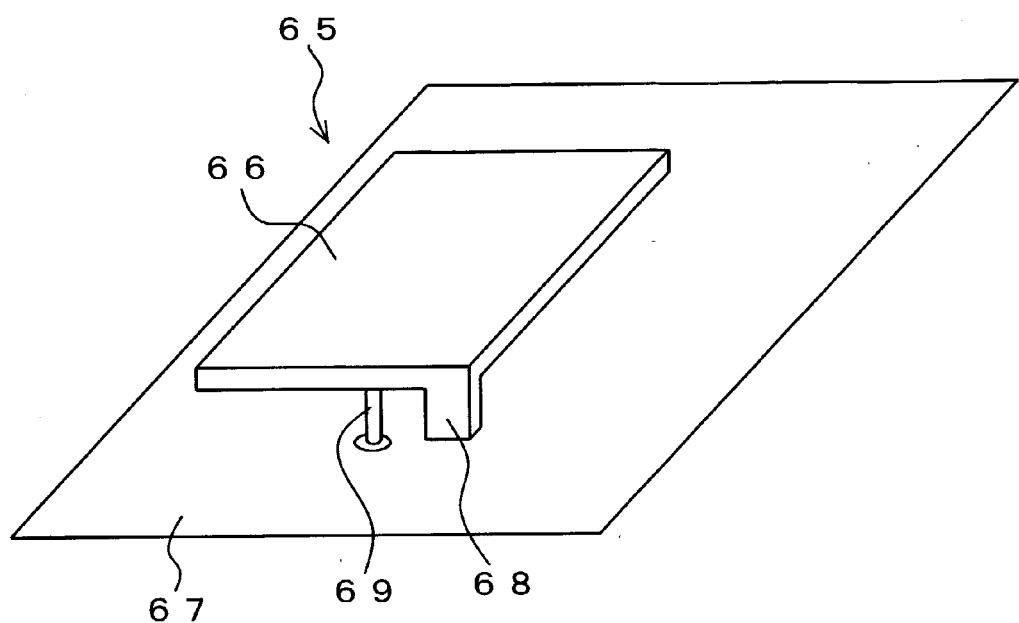
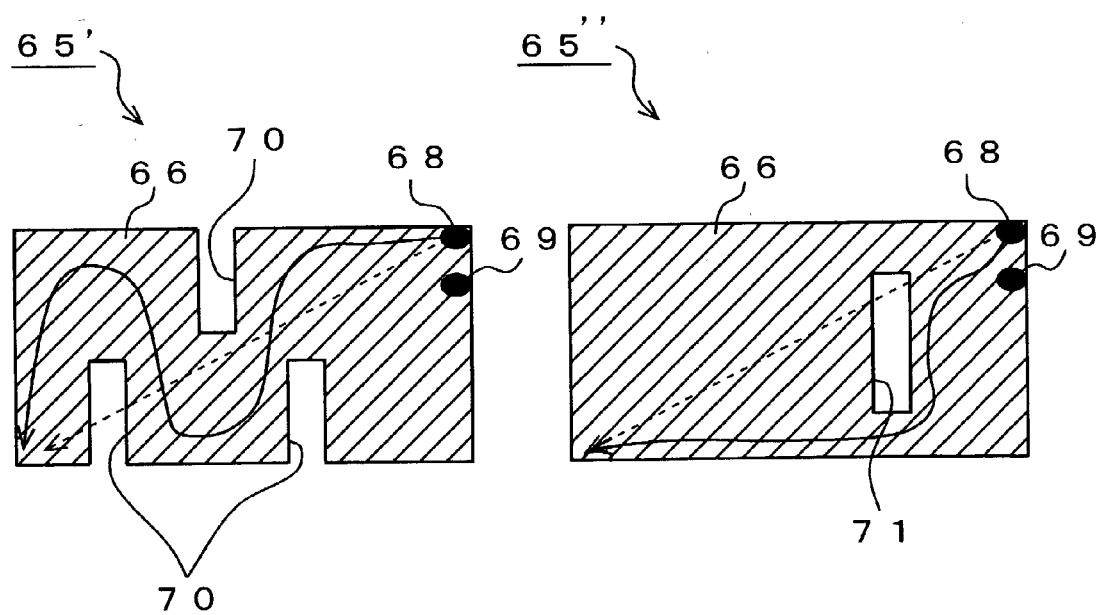
FIG. 2A       FIG. 2B

FIG. 3
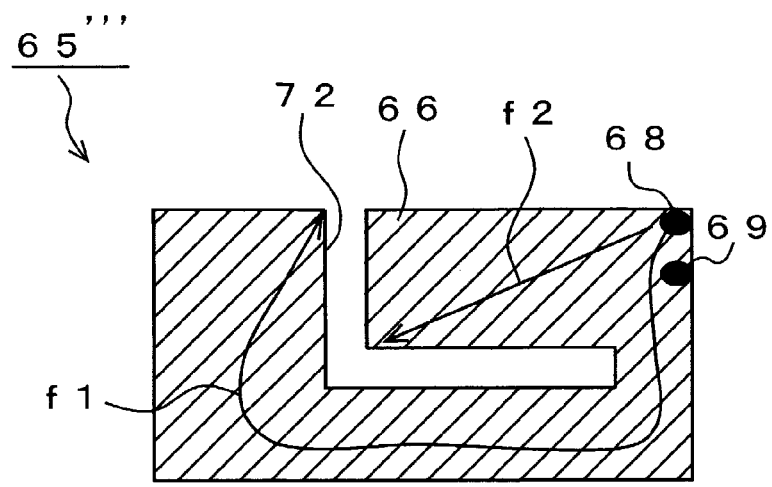
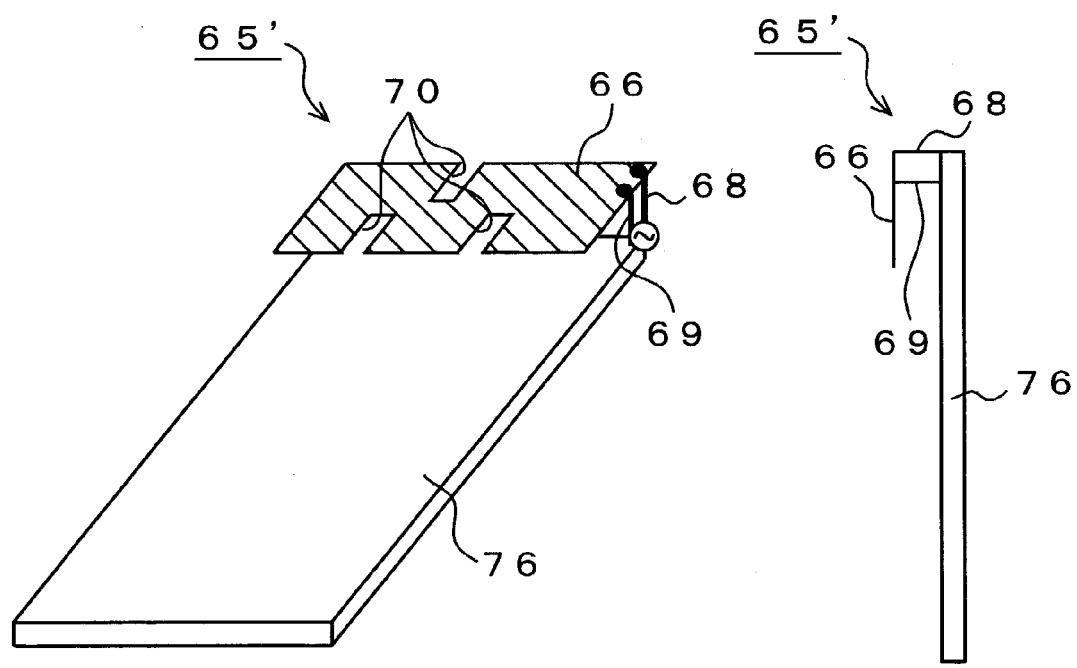
FIG. 4A               FIG. 4B

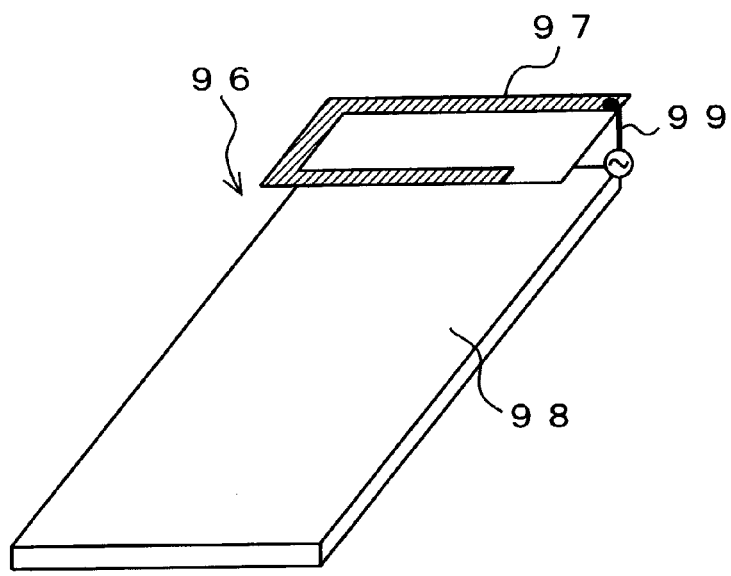 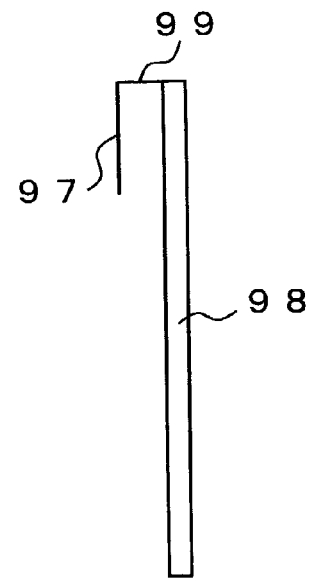
FIG. 9A  FIG. 9B
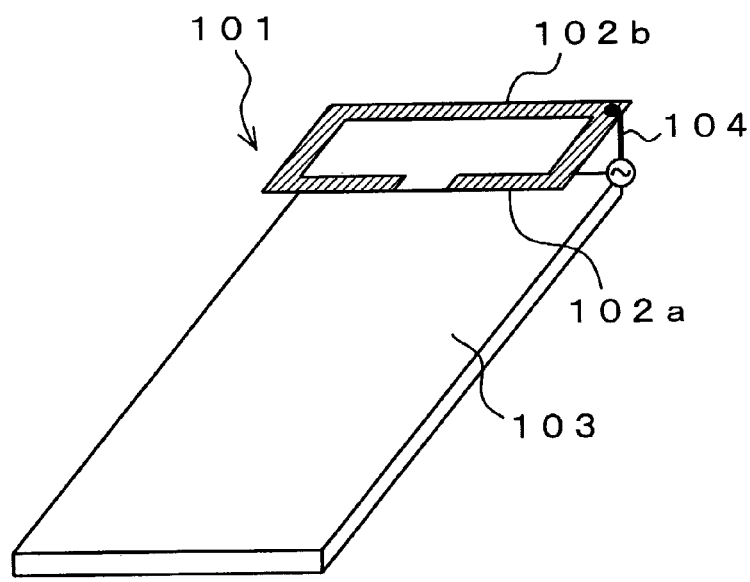 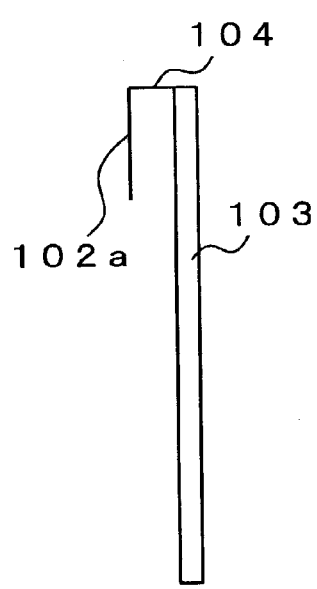
FIG. 10A  FIG. 10B

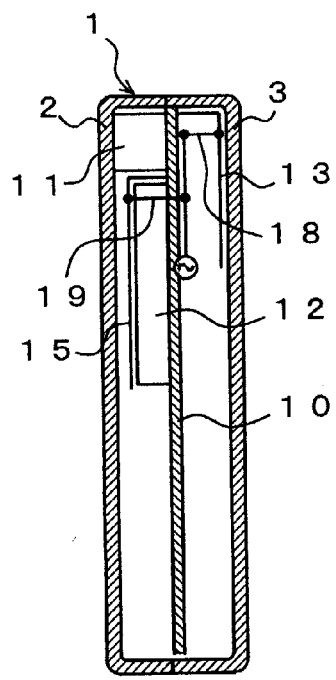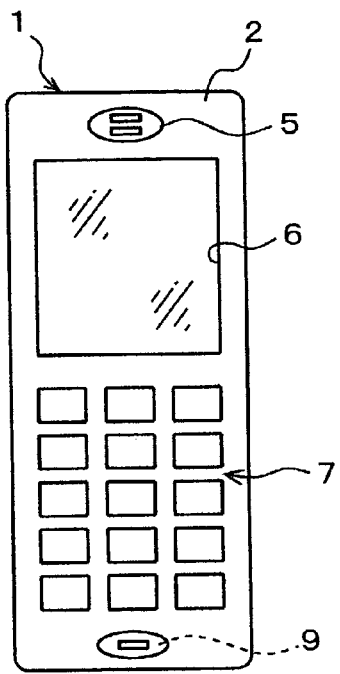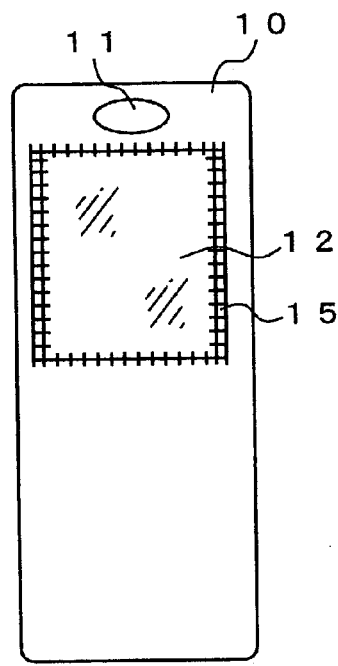
FIG. 15B  FIG. 15A  FIG. 15C
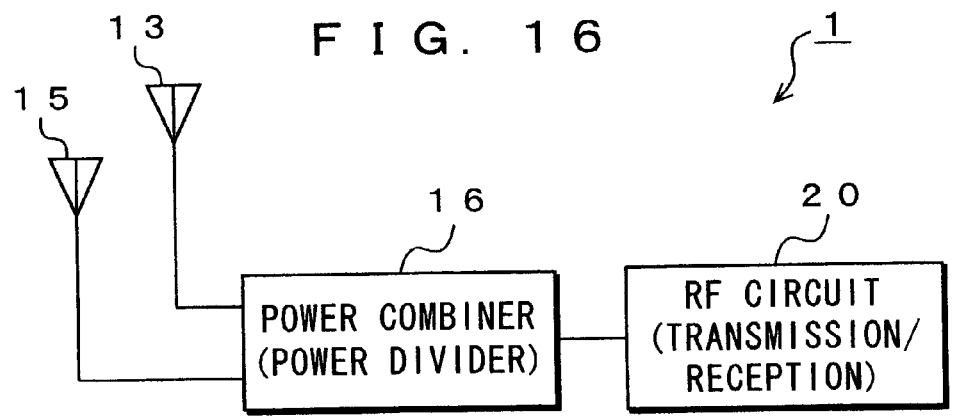
FIG. 16

FIG. 19
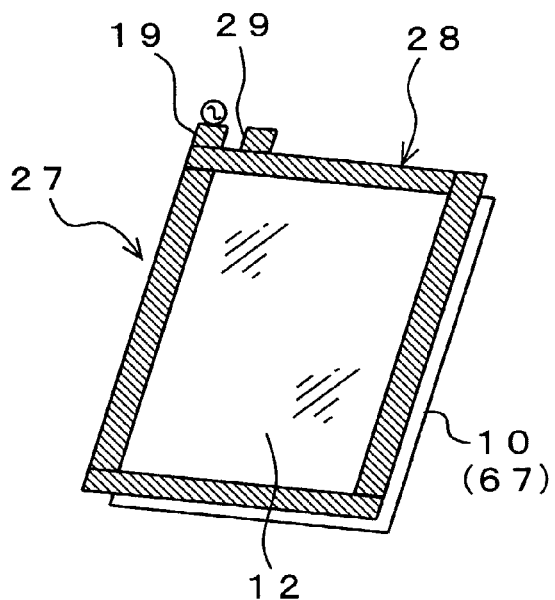
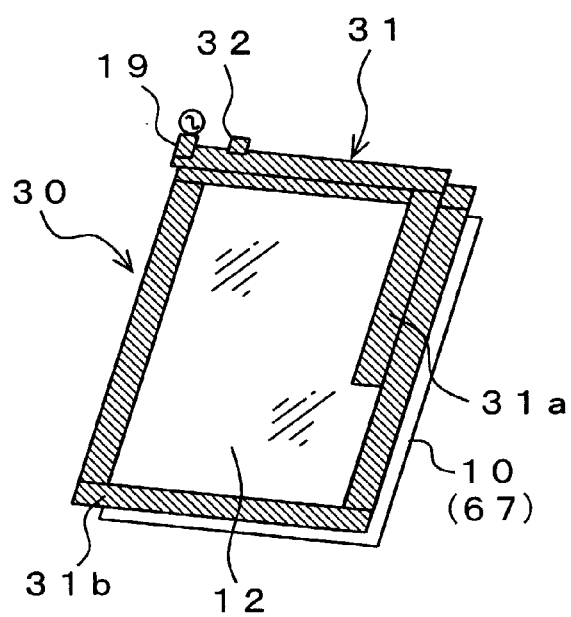
FIG. 20A
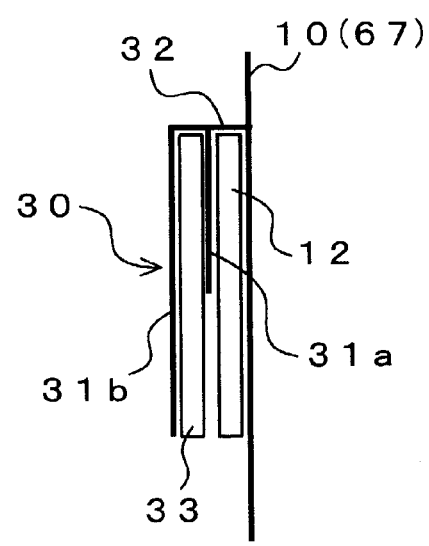
FIG. 20B

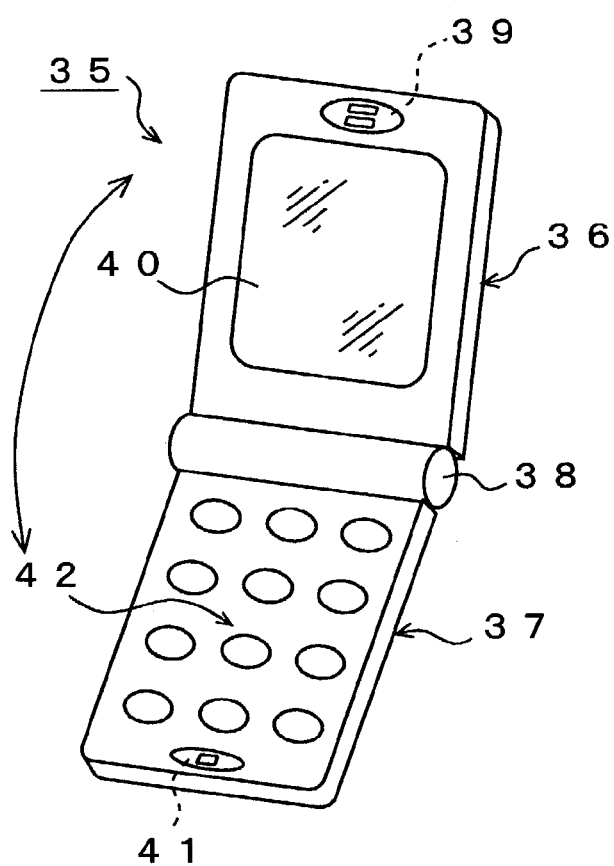
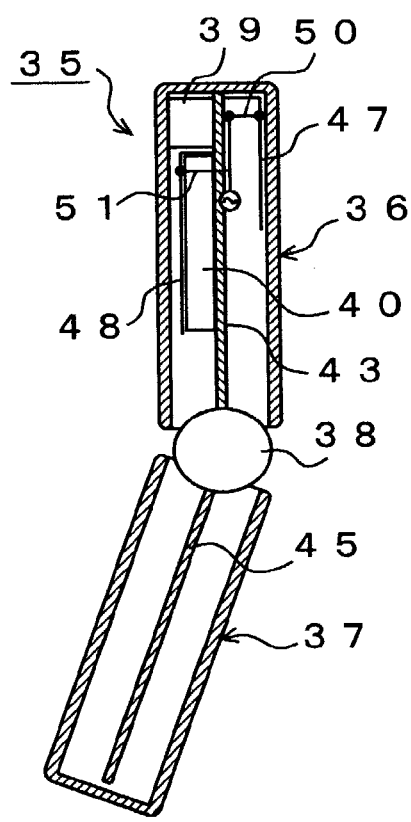
FIG. 23A      FIG. 23B
FIG. 24
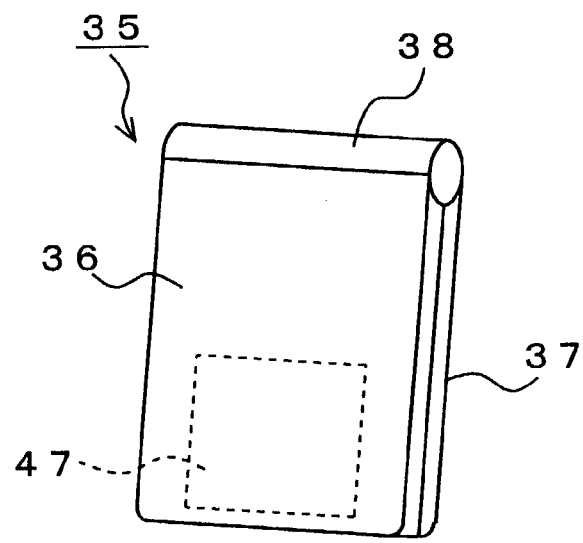

WIRELESS COMMUNICATION DEVICE WITH TWO INTERNAL ANTENNAS

TECHNICAL FIELD

The invention relates to a portable wireless communication terminal device for use in, for example, stick type and foldable cellular phones having a data communication function and a telephone function. More specifically, it relates to a portable wireless communication terminal device having a first antenna set in the casing on the opposite side with respect to a liquid crystal display (LCD) and a second antenna mounted on a periphery of the LCD, thereby securing stable antenna characteristic and stable communication quality by the second antenna.

BACKGROUND ART

In recent years, portable wireless communication terminal devices have been increasingly used as means for mobile communications. As suitable antennas for these terminal devices, so called built-in antenna put inside the terminal device has been used more often. The terminal devices having the built-in antenna have advantages over generally accepted conventional ones having external antenna mounted on an exterior thereof in that the terminal devices having the built-in antenna are less likely to be damaged if dropped and provide a better freedom in the design of the portable wireless communication terminal device.

FIG. 1 is a perspective view of an exemplary planar inverted-F type antenna 65. The planar inverted-F type antenna 65 of FIG. 1 is a typical built-in antenna for use in a portable wireless communication terminal device. This antenna 65 comprises a radiative conductor section 66, a ground 67 opposing the radiative conductor section 66, a short-circuiting section 68, and a feeding pin 69, and thus, their appearance represent an inverted-F shape, as viewed from a side thereof. In this antenna 65, the resonance frequency thereof is determined by a size of the radiative conductor section 66.

FIG. 2A is a diagram for showing a current path in an antenna 65' having the radiative conductor section with a slit therein. FIG. 2B is a diagram for showing a current path in an antenna 65" having the radiative conductor section with a slot therein. The resonance length of each of the antennas 65' and 65" is made longer by forming a slit (cut out portion) 70 or a slot 71 in the radiative conductor section 66, as shown in FIGS. 2A and 2B. This allows the antennas 65' and 65" to be made more compact.

In FIGS. 2A and 2B, wave lines illustrate current paths in the respective antennas 65' and 65" before the slit 70 and slot 71 have been formed, that is, the antennas have been miniaturized. Solid lines illustrate the current paths after the slit 70 and the slot 71 have been formed to miniaturize the antennas 65' and 65". As shown in FIGS. 2A and 2B, the distance between the radiative conductor section 66 and the ground 67 (not shown in these figures) affects the bandwidth of an antenna like 65' and 65". For example, if the distance is made larger, the volume of a space formed between the radiative conductor section 66 and ground 67 increases, which in turn increases the bandwidth more often.

It is also possible to miniaturize the antenna 65 for example by filling the space between the radiative conductor section 66 and ground 67 with a dielectric material. In this case, however, the resultant bandwidth will be decreased. The short-circuiting section 68 is peculiar to a planar inverted-F type antenna structure, which is equivalent to a reduction in the radiating area of a planar antenna, typically a micro-strip antenna, having no short-circuiting section 68 to about ¼. The reduction is estimated according to a case where they are compared as their radiative conductor sections are respectively shaped into a square.

The feeding pin 69 is mounted at an appropriate position so that the input impedance of the radiative conductor section 66 matches the impedance of the feeding circuit formed on the circuit board. Mounting the feeding pin 69 at that position allows the antenna 65 or the like to be powered.

It is noted that on account of rapid popularization of cellular phones in recent years, only lines currently allocated for a single wireless communication system in a bandwidth are not sufficient for the phones. In order to secure sufficient lines, use of different bandwidths belonging to two kinds of wireless communication systems has been proposed. For example, there has been developed a portable wireless communication terminal device for dual-band, which enables use of two kinds of wireless communication systems in one portable wireless communication device.

Naturally, the antenna 65 and the like to be mounted on such dual-band terminal device are required to support the dual-band (i.e. dual frequency band) communication. This requirement for supporting the dual-band communication can be generally attained in a planar inverted-F type antenna by forming a slit 72 in the radiative conductor section 66 so as to establish two resonance lengths therein, as exemplified by a planar inverted-F type antenna 65''' shown in FIG. 3. In FIG. 3, a longer current path f1 indicates the one relating to a low-frequency band, while a shorter current path f2 indicates the one relating to a high-frequency band.

FIG. 4A is a perspective view of a configuration of a portable wireless communication terminal device equipped with a planar inverted-F type antenna mounted on a circuit board 76 of the device, and FIG. 4B is a side view thereof. Mounted at one position of the circuit board 76 of FIG. 4A is a planar inverted-F type antenna 65'. The portions of the antenna 65' are shown schematically in FIGS. 4A and 4B. Elements not relevant to the antenna 65' are omitted in the Figures.

In general, a portable wireless communication terminal device has the circuit board 76, a shield case (not shown) and a casing. The circuit board 76 includes an electronic circuit for operating the portable wireless communication terminal device. The shield case is provided for shielding the circuit board 76. The casing is provided for protecting the circuit board and the shield case.

When an antenna is built in the portable wireless communication terminal device of this type, the ground (not shown) of the circuit board 76 is formed as the ground 67 of the antenna 65' and the like, the shield case is formed as the ground 67 or a shield case is formed in a part of an interior of the antenna 65' and the like, as an intermediate therebetween. In FIGS. 4A and 4B, the simple structured circuit board 76 is illustrated as a ground 67 of the antenna 65' and the like. In the example shown herein, the planar inverted-F type antenna of FIG. 2A is employed and the circuit board 76 is illustrated as the ground 67 of the antenna 65'.

In these portable wireless communication terminal devices having a built-in antenna 65 and the like, the casing is in general made of a non-conductive material such as a resin, at least in the neighborhood of the antenna. The radiative conductor section 66 is made of a sheet metal, which is glued to the inside of a non-conductive casing, or mounted on non-metallic (e.g. a resin) spacers provided between the radiative conductor section and the ground.

The short-circuiting section 68 and the feeding pin 69 are constituted of expandable spring connectors (feeding springs). The spring connectors are soldered to the circuit board 76 for mechanical and electrical coupling with the circuit board 76. However, the spring connector serving as the short-circuiting section is coupled to the ground of the circuit board, and the spring connector serving as the feeding element is connected to the conductive pattern of the circuit board, which is connected to the feeding circuit.

The circuit board 76 is in general loosely secured to the casing in order to reduce a strong shock that might damage the circuit board 76 when, for example, the portable wireless communication terminal device is dropped on the floor. Some portable wireless communication terminal devices utilize an inverted-L type antenna structure that is structurally equivalent to a monopole antenna bent at an intermediate point to miniaturize the antenna.

FIG. 5 shows a ¼-wavelength monopole antenna 80 for a given frequency. This antenna comprises an antenna element 79 put up on a vast ground plane 78 having a length longer than one wavelength. An image current can be established in the vast ground 78. Hence, the overall antenna characteristics of the antenna 80 is substantially the same as that of a ½-wavelength dipole antenna 82 consisting of symmetric antenna elements 81 and 81 as shown in FIG. 6.

FIG. 7 shows an inverted-L type antenna 85, i.e. antenna having an inverted-L shape as viewed from a side thereof. This antenna is equivalent to a monopole antenna bent midway, which can have a low profile. As an example, the inverted-L type antenna 85 has a ground 83 and an antenna element 84 mounted oh the ground. The antenna element 84 is formed by bending a monopole antenna at an intermediate point thereof.

However, a current passing through the horizontal section (the section parallel to the ground 83) of the antenna element 84 of the inverted-L type antenna 85 has an opposite phase as compared with the image current. As a result, the horizontal section does not greatly contribute to radiation, and thus the inverted-L type antenna 85 has a smaller radiation resistance than the ¼-wavelength monopole antenna has. Consequently, a length of the vertical section of the antenna element determines real part of the input impedance of the inverted-L type antenna, so that the real part is small.

On the other hand, a length of the horizontal section of the antenna element 84 determines the reactance part (i.e. imaginary part of the input impedance), which can be set to either capacitive large value or inductive large value depending on an electric length of the antenna element 84. Hence, it is not easy to match the impedance at the feeding point with only a general feed line of 50 Ω (Ohms). Inserting a matching circuit 89 between the antenna 87 and the ground 88 allows this problem to be solved.

For example, when the antenna impedance has a capacitive large value, an inductive reactance element (inductor) 91 is connected between the antenna 87 and the ground 88 so as to be parallel to them as shown in FIG. 8B. When the antenna impedance has an inductive large value, a capacitive reactance element (capacitor) 92 is connected between the antenna 87 and the ground 88 so as to be parallel to them as shown in FIG. 8C. Thus, this connection allows the impedance matching to be easily established in a simple circuit arrangement.

A inverted-L type antenna for dual-band (dual frequency band) can be implemented by setting two inverted-L type antenna elements for the respective corresponding bandwidths with the portions of the two antenna elements being sufficiently separated near their feeding points, thereby unaffected by their coupling.

Matching circuit for the dual-band antenna can be implemented in a simple form, similar to the one as shown in FIGS. 8A–8C. This is because it is possible to adjust the resonance lengths and the impedance of high-frequency and low-frequency inverted-L type antenna elements independently if they are so arranged as to be unaffected by their coupling. For this purpose, prior to inserting the matching circuit, the high-frequency impedance and low-frequency impedance are adjusted so that they occupy the same position on the Smith chart as much as possible. This adjustment can be done easily, for the reason mentioned above.

Each of the FIGS. 9A, 10A, and 11A is perspective view of a configuration of a portable wireless communication terminal device equipped with various types of planar inverted-L type antennas 96. Each of the FIGS. 9B, 10B, and 11B is schematic side view of the device. Irrelevant portions of the antennas 96 and 101 are omitted from any of these figures.

FIG. 9A is schematic diagram for showing a planar inverted-L type antenna 96 for a single-band and FIG. 9B is a side view thereof. An antenna element 97 of FIG. 9A is a radiative conductor section of the antenna 96, and then the element constitutes an inverted-L type antenna structure with a monopole antenna being bent to make it short. The antenna element 97 receives power from circuit board 98 via a feeding pin 99.

FIG. 10A is schematic diagram for showing a planar inverted-L type antenna 101 for dual-band and FIG. 10B is a side view thereof. Antenna elements 102a and 102b of FIG. 10A are radiative conductor sections of the antenna 101, and the elements constitute inverted-L type antenna structures with a monopole antenna being bent to make it short. The antenna elements 102a and 102b are fed power from circuit board 103 via a feeding pin 104. The radiative conductor section 102a having a shorter electric length for a high-frequency band is provided on a side of the feeding pin 104. The radiative conductor section 102b having a longer electric length for a low-frequency band is provided on the other side of the feeding pin 104.

FIG. 11A schematic diagram for showing a configuration of a planar inverted-L type antenna 106 for dual-band and FIG. 11B is a side view thereof. Antenna elements 107a and 107b of FIG. 11A are radiative conductor sections of the antenna 106, each constituting an inverted-L type antenna structure with a monopole antenna being bent to male it short. The antenna elements 107a and 107b are fed power from circuit board 108 via respective feeding pins 109a and 109b. The built-in antennas as described above are usually disposed on the upper end of the back panel, and behind a speaker, of the portable wireless communication terminal device.

FIG. 12 is sectional side view showing a configuration of a portable wireless communication terminal device 111. The portable wireless communication terminal device 111 of FIG. 12 has a casing 112. Installed inside the casing 112 is a circuit board 113. A speaker 114 for allowing the voice of a caller to be output as sound, an LCD for displaying different kinds of information and the like are mounted on top of a surface of the circuit board 113.

Mounted on top of the backside, behind the speaker 114, of the circuit board 113, is a built-in antenna 115. Such the configuration that the built-in antenna 115 is disposed on top of the backside, behind the speaker 114, of the portable wireless communication terminal device 111 is due to a fact that the built-in antenna 115 can have a wider frequency band if it is disposed on top of the portable wireless communication terminal device 111, the antenna is least susceptible to a human body when the portable wireless communication terminal device 111 is called in progress, or the like.

When the built-in antenna 115 is installed inside the portable wireless communication terminal device 111, it is likely that a radiation characteristic of the built-in antenna 115 lessens if the device 111 is placed on a table T with its LCD and key board oriented upward as shown in FIG. 13, during its standby state, for example.

A cellular phone, which is an example of the portable wireless communication terminal device, has been more often used in recent years with it placed on a table because it is used not only as a mere voice communication tool but also as a data communications tool. Furthermore, if the table T is a metallic one, placing the device on the table T with the face of the LCD, etc., oriented upward results in a serious lessening of the antenna characteristic of the built-in antenna 115.

The antenna characteristic also lessens if fingers are placed over the built-in antenna 115 as shown in FIG. 14. It can be said that likelihood of covering the built-in antenna 115 with, for example, fingers is increasing in view of the fact that the portable wireless communication terminal device has been more and more miniaturized in recent years, even if the built-in antenna 115 is disposed in the above mentioned antenna arranging position, which is less susceptible to the human body.

DISCLOSURE OF INVENTION

A portable wireless communication terminal device in accordance with the invention has a data communications function and a telephone function. The device comprises a casing, display means having a display section exposed through an opening of the casing, a circuit board installed in the casing and having the display means on at least one surface of the circuit board, a first antenna electrically connected to the circuit board and disposed on an opposite side to the display section of the display means, and a second antenna electrically connected to the circuit board and mounted on a periphery of the display means on the display section side thereof.

According to the portable wireless communication terminal device of the invention, disposing the first antenna on an opposite side to the display means inside the casing, and mounting the second antenna on the periphery of the display means on the display section side thereof inside the casing allow electromagnetic waves transmitted to and received from the second antenna to be shut off by an obstacle if the portable wireless communication terminal device is placed on a table with the display means oriented upward while it is on standby state, data communication state or the like, or if the user's fingers are covering the first antenna section as he or she holds it in his hand to look at the display means. Accordingly, the device does not lessen a communication quality as compared with conventional device having only the first antenna, thereby maintaining the stable antenna characteristic and communication quality thereof.

The second antenna, mounted on the periphery of the LCD for example, also serves as a conductive element for protecting devices of the LCD from electrostatic discharge damage. This prevents numbers of parts for adding the second antenna and the costs therefor from being increased, thereby resulting in less numbers of parts and reducing the costs.

BRIEF DESCRIPTION OF THE DRAWINGS

FIG. 1 is a perspective view of a configuration of a conventional planar inverted-F type antenna 65.

FIG. 2A is a diagram for showing a current path in antenna 65' having a slit in the radiative conductor section; and FIG. 2B is a diagram for showing a current path in antenna 65" having a slot in the radiative conductor section.

FIG. 3 is a diagram for showing a radiative conductor section 66 having another slit.

FIG. 4A is a schematically perspective view of a configuration of a portable wireless communication terminal device having a planar inverted-F type antenna structure; and FIG. 4B is a schematic diagram for showing a side view thereof.

FIG. 9A is a perspective view for showing a configuration of a planar inverted-L type antenna 96 for a single-band; and FIG. 9B is a schematically side view thereof.

FIG. 10A is a schematic diagram for showing a configuration of a planar inverted-L type antenna 101 for a dual-band; and FIG. 10B is a schematic diagram for showing a side view thereof.

FIG. 15A is a front view of a portable wireless communication terminal device 1 according to a first embodiment of the invention; FIG. 15B is a sectional side view thereof; and FIG. 15C is a schematic diagram for showing a configuration of a built-in printed circuit board.

FIG. 16 is a rough block diagram showing a configuration of the portable wireless communication terminal device 1.

FIG. 19 is a schematic diagram for showing a configuration of a second built-in antenna 27 for a single-band.

FIG. 20A is a schematic diagram for showing a configuration of a second built-in antenna 30 for a dual-band; and FIG. 20B is a schematic diagram for showing a side view thereof.

FIG. 23A is a perspective view of a configuration of a portable wireless communication terminal device 35 in accordance with a second embodiment of the invention; and FIG. 23B is a side view thereof.

FIG. 24 is a perspective view of a configuration of the portable wireless communication terminal device 35 when it is folded.

BEST MODE FOR CARRYING OUT THE INVENTION

Figure 5:
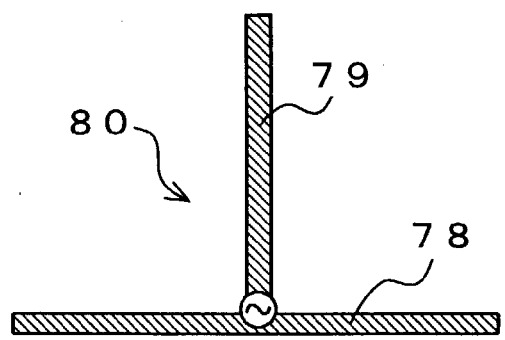
FIG. 5 is a diagram for showing a configuration of a ¼-wavelength monopole antenna.
Figure 6:
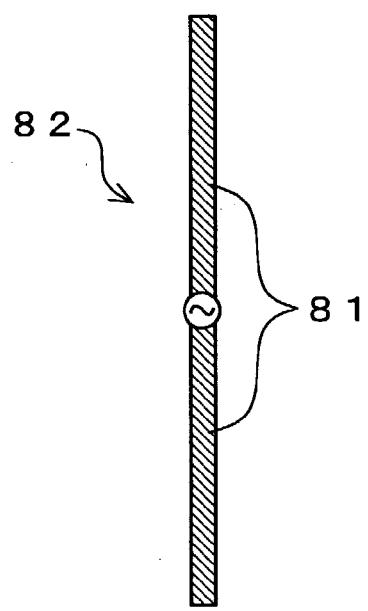
FIG. 6 is a diagram for showing a configuration of a ½-wavelength dipole antenna having symmetrical antenna elements.
Figure 7:
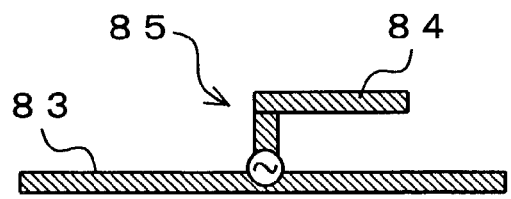
FIG. 7 is a diagram for showing a configuration of an inverted-L type antenna 85.

It is an object of this invention to provide a portable wireless communication terminal device for preventing its antenna characteristic and communication quality from lessening if the device is placed on a table or if the top of back surface of the device is covered with the fingers of a user.

The invention will now be described in detail by way of example with reference to the accompanying drawings. FIG. 15A is a front view of a portable wireless communication terminal device according to a first embodiment of the invention. FIG. 15B is a sectional side view thereof. FIG. 15C is a schematic diagram for showing a configuration of a built-in printed circuit board.

The portable wireless communication terminal device 1 of FIG. 15A is preferably applied to a stick type cellular phone, a foldable cellular phone and the like each having a data communication function and a telephone function. The device 1 has a casing of a predetermined configuration. The casing includes a front panel 2 and a rear panel 3. The upper section of the front panel 2 includes a receiver 5 for allowing a user to hear voice of a caller, and an opening window 6 for displaying various kinds of information. For this reason, attached to the opening window 6 is a liquid crystal display (LCD) 12 as an example of display means. Mounted inside the receiver 5 is a speaker. The LCD 12 has a display section. A TFT type color LCD, for example, may be used as the display means.

Arranged below the opening window 6 of the front panel 2 are various kinds of operational keys 7 including a power switch, ten keys (keys numbered 0–9), other function keys. A microphone 9 for picking up user's voice is provided at a position lower than these keys. The microphone 9 is used as a telephone transmitter.

A circuit board such as a printed circuit board 10 is provided in an inside space provided between the front panel 2 and the rear panel 3 as shown in FIG. 15B. Fixed on upper end of the printed circuit board 10 on the surface side thereof, as shown in FIG. 15C are a speaker 11 for outputting voice of a caller as sound, and the LCD 12 for displaying various kinds of information. A second built-in antenna 15 is mounted on a periphery of the LCD 12. The second built-in antenna 15 will be described in detail later.

As shown in FIG. 15B, a first built-in antenna 13 as a first antenna is installed at a top of the printed circuit board 10 on the backside thereof, behind the speaker. A second built-in antenna 15 as a second antenna is mounted on the periphery of the LCD 12 on the surface side of the printed circuit board 10. Electric power is supplied simultaneously from the printed circuit board 10 to the first and second built-in antennas 13 and 15, respectively, via respective feeding sections 18 and 19.

Thus, in the portable wireless communication terminal device 1 of the invention, the first built-in antenna 13 is installed inside the casings 2 and 3 on the opposite side (backside) of the LCD 12, while the second built-in antenna 15 is mounted on the periphery of the LCD 12 inside the casings 2 and 3.

Consequently, this prevents electromagnetic waves the second antenna transmits or receives from being shut off by an obstacle if the portable wireless communication terminal device 1 is placed on a table with the display means oriented upward while it is on standby state, data communication state or the like, or if the user holds the portable wireless communication terminal device 1 and looks at the LCD 12.

Thus, as compared with the conventional one having only the first built-in antenna 13, the device according to the invention does not lessen antenna characteristic, so that it can maintain stable antenna characteristic and stable communication quality.

FIG. 16 is a circuit block diagram representing a configuration of the portable wireless communication terminal device 1. In the portable wireless communication terminal device 1 shown in FIG. 16, the first and second built-in antennas 13 and 15, respectively, are electrically connected to a transmission/reception circuit (RF circuit) 20 via respective feeding sections 18 and 19 and a power combiner 16 (which can also function as power divider). The first and second built-in antennas 13 and 15, respectively, receive electromagnetic waves from a wireless base station, not shown. The received signal is supplied to the transmission/reception circuit 20 via the feeding sections 18 and 19 and the power combiner (power divider) 16.

On the other hand, the transmission/reception circuit 20 supplies a transmission signal to the first built-in antenna 13 or the second built-in antenna 15 via the power combiner (power divider) 16 and the feeding sections 18 and 19. The transmission signal is then transmitted from the first built-in antenna 13 or the second built-in antenna 15 in the form of electromagnetic waves. Of course, the transmission signal may be supplied simultaneously to the first and second built-in antennas 13 and 15 and then it is simultaneously transmitted from the two antennas 13, 15.

Next, the second built-in antenna 15 will be described with reference to specific embodiments. Since the LCD 12 is always visible to the user, an antenna element 22 of the antenna 15 cannot be mounted at the center of the LCD 12. On the other hand, the peripheral region of the LCD 12 is not visible when it is covered with the front panel 2. Thus, in the embodiments shown, the antenna element 22 is mounted on the periphery of the LCD 12.

Figure 17:
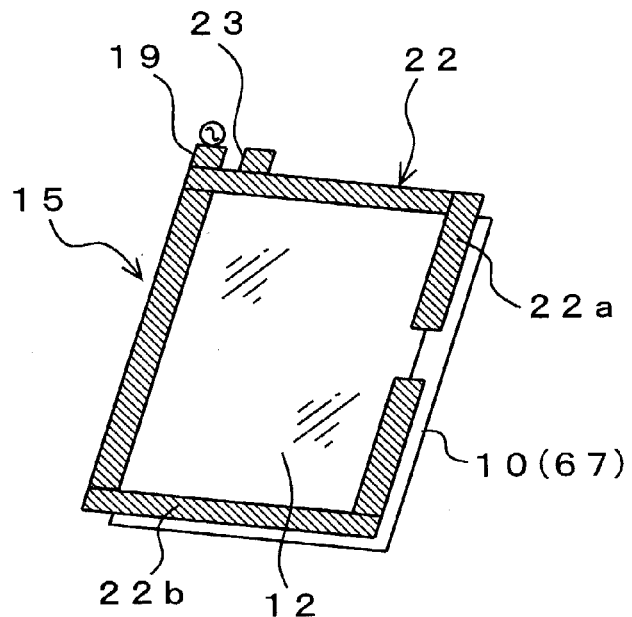
FIG. 17 is a schematic diagram for showing a configuration of a second built-in antenna 15.

FIG. 17 is a schematic perspective view of a second built-in antenna having an inverted-F type antenna structure. The second built-in antenna 15 shown in FIG. 17 has the inverted-F type antenna structure in which the antenna element 22 is mounted on the periphery of the LCD 12. The antenna element 22 is provided with a feeding section 19 for supplying power thereto. Arranged near the feeding section 19 is the printed circuit board 10, which also serves as a ground 67 of the antenna. A short-circuiting section 23 is connected between the ground 67 and the antenna element 22. The second built-in antenna 15 thus constructed forms a linear inverted-F type antenna structure, which has an inverted-F shape as viewed from a side thereof.

Since the antenna element 22 of the second built-in antenna 15 is mounted on the periphery of the LCD 12, it has a small width. In view of this, the antenna element 22 is provided with a short-circuiting section 23 for setting up a proper electric length of the antenna element 22 and for matching its impedance to 50 Ohms ($\Omega$). Thus, the second built-in antenna 15 having a high-frequency radiative conductor section 22$a$ and a low-frequency radiative conductor section 22$b$ is made operable as the linear inverted-F type antenna structure.

Although an inverted-F type antenna structure for a dual-band is employed in the example shown in FIG. 17, it may be replaced by an antenna structure for a single-band (i.e. single frequency band). The antenna element 22 can be made of any material such as a metal slab and a thin copper tape, so long as the conductivity of the material highly achieves and the radiation efficiency of the antenna does not lessen.

Figures 18A, 18B:
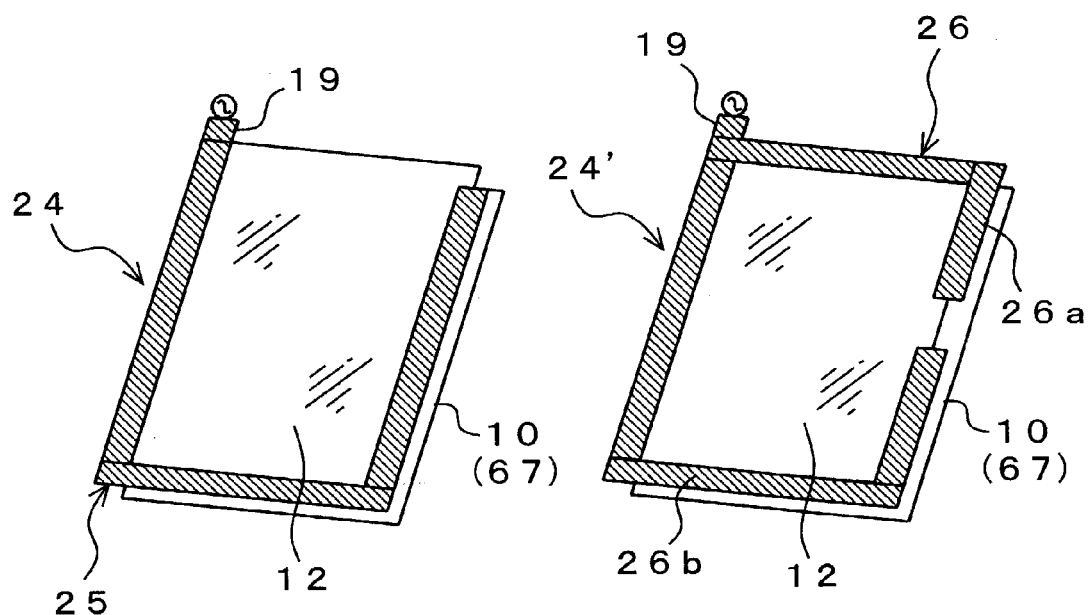
FIG. 18A is a schematic diagram for showing a configuration of another second built-in antenna 24.
FIG. 18B is a schematic diagram for showing a configuration of still another second built-in antenna 24'.

FIG. 18A is a schematic diagram for showing a configuration of another second built-in antenna 24. FIG. 18B is a schematic diagram for showing a configuration of further second built-in antenna 24'. As shown in FIGS. 18A and 18B, the second built-in antennas 24 and 24' are constituted of a respective inverted-L type antenna structure, which have an inverted-L shape as viewed form a side thereof. The antenna structure of FIG. 18A is intended for single-band use, while the antenna structure of FIG. 18B is for dual-band use.

The antenna element 25 of the second built-in antenna 24 shown in FIG. 18A consists of an inverted-L type antenna structure, which has an inverted-L shape as viewed form a side thereof, with a monopole antenna bent to make it shorter.

The antenna element 26 of the second built-in antenna 24' shown in FIG. 18B also consists of an inverted-L type antenna structure, which has an inverted-L shape as viewed form a side thereof, with a monopole antenna bent to make it shorter. As shown in FIG. 18B, a radiative conductor section 26$a$ having a longer electric length for a high-frequency band is formed on one side of the feeding section 19, and a radiative conductor section 26$b$ having a shorter electric length for a low-frequency band is formed on the other side of the feeding section 19.

Since the second built-in antennas 24 and 24' of FIGS. 18A and 18B are equivalent to the ones formed by shortening the monopole antenna, the antenna elements 25 and 26 may have narrow widths, which is convenient to arrange them on the periphery of the LCD 12.

Figure 8A:
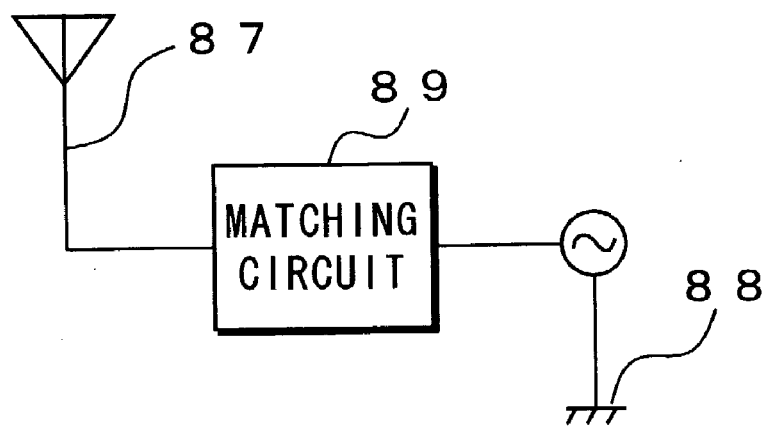
FIG. 8A is a circuit diagram for showing a case where a matching circuit is inserted between an antenna and a ground.
Figure 8B:
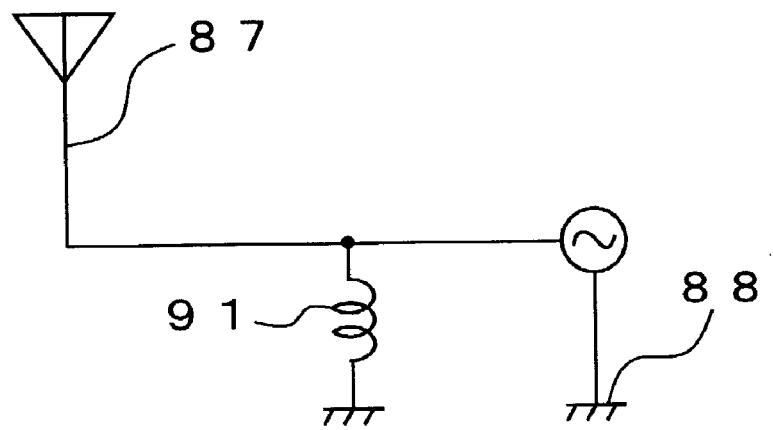
FIG. 8B is a circuit diagram for showing a case where an inductive reactance element is connected between the antenna and the ground.
Figure 8C:
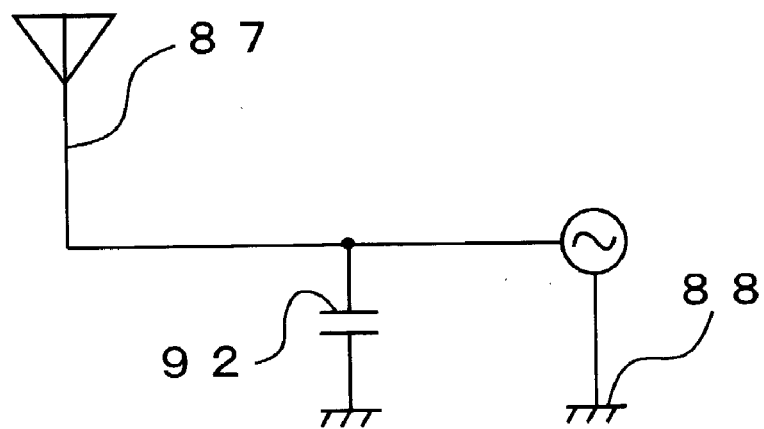
FIG. 8C is a circuit diagram for showing a case where a capacitive reactance element is connected between the antenna and the ground.
Figures 11A, 11B:
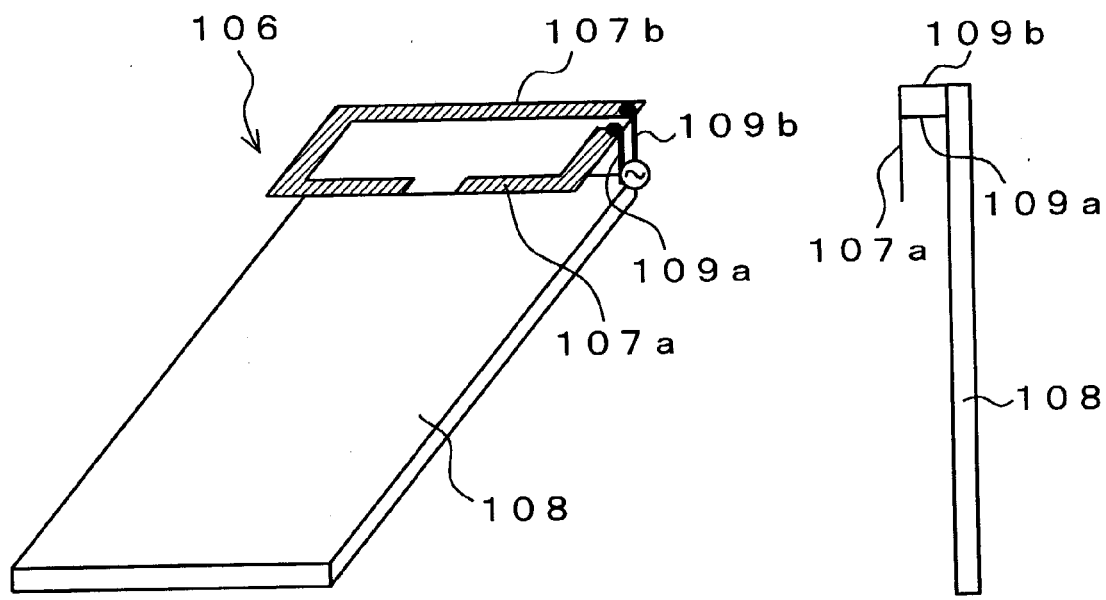
FIG. 11A is a schematic diagram for showing a configuration of another planar inverted-L type antenna 106 for a dual-band.
FIG. 11B is a schematic diagram for showing a side view thereof.
Figure 12:
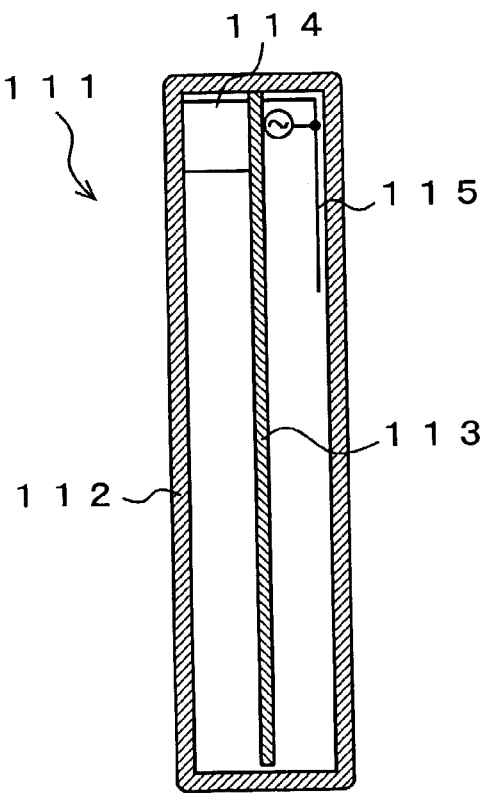
FIG. 12 is a sectional side view of a configuration of a conventional portable wireless communication terminal device 111.
Figure 13:
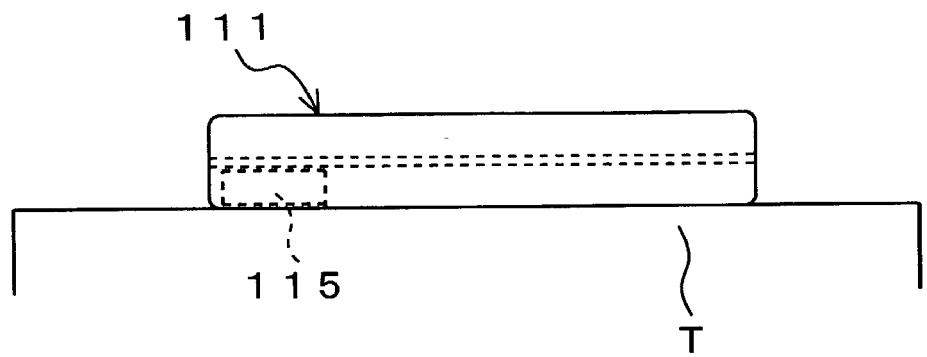
FIG. 13 is a diagram for explaining a condition of the portable wireless communication terminal device 111 placed on a table.
Figure 14:
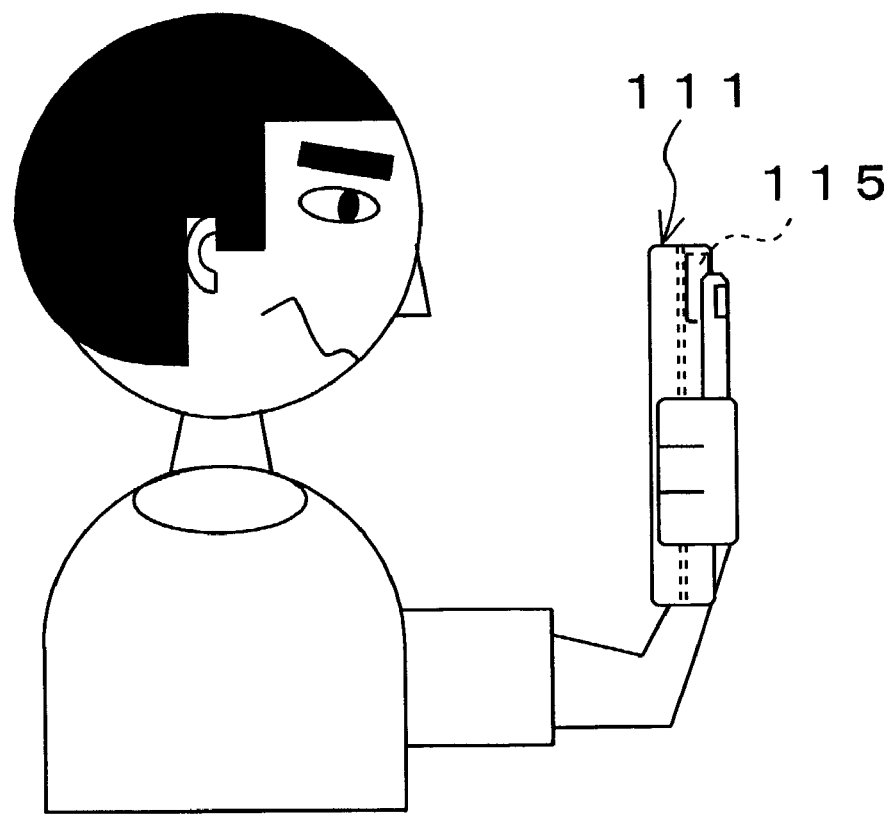
FIG. 14 is a diagram for explaining a condition of the portable wireless communication terminal device 111 with its built-in antenna partly covered with fingers.

Although not shown in FIGS. 18A and 18B, an impedance matching circuit like the ones shown in FIGS. 8A–8C is provided in a respective subsequent stage of the antenna because it is difficult to match the impedance to 50 Ohms by solely an inverted-L type antenna structure itself.

A configuration of a still another second built-in antenna will be described below. Since the portable wireless communication terminal devices are weak against static electricity, various kinds of the mounting parts or devices are provided with a countermeasure against static electricity. This is often the case with devices for controlling the LCD 12. As an anti-electrostatic discharge damage means, the LCD 12 may be often provided on the periphery thereof with a conductive element short-circuited to a pattern of the ground 57 of a printed circuit board (circuit board) 10.

In the embodiment shown herein, configurations of second built-in antennas 27 and 30 wherein the conductive element for preventing electrostatic discharge damage is also used as the built-in antenna will be respectively described later.

FIG. 19 is a schematic diagram for showing a configuration of the second built-in antenna 27 for the single-band. For the second built-in antenna 27 shown in FIG. 19, the short-circuiting section connected to a pattern of the ground 67 on the printed circuit board 10 is the short-circuiting section 29 of the inverted-F type antenna structure, which constitutes the second built-in antenna 27, and the conductive element around the LCD 12 is the radiative conductor section 28. A inverted-F type antenna structure having a slot is cast in this configuration.

As seen in this embodiment, however, it is difficult to realize dual-band of the inverted-F type antenna structure having the slot by using a single conductive element. As an alternative, the low-frequency radiative conductor section may be disposed over the high-frequency radiative conductor section via spacers.

FIG. 20A is a schematic diagram for showing a configuration of the second built-in antenna 30 for a dual-band and FIG. 20B is a schematic diagram for showing a side view thereof. The inverted-F type antenna structure having the slot as shown in FIG. 20A constitutes the second built-in antenna 30 for the dual-band. This antenna structure allows the dual-band to be realized using a single conductive element.

The second built-in antenna 30 comprises a short-circuiting section 32 and an antenna element 31. The antenna element 31 includes a high-frequency radiative conductor section 31$a$ and a low-frequency radiative conductor section 31$b$ with the low-frequency radiative conductor section 31$b$ being mounted, via a spacer 33, on the high-frequency radiative conductor section 31$a$ that is mounted on the periphery of the LCD 12.

When the second built-in antenna 30 is to serve also as a conductive element for protecting an LCD control device against electrostatic discharge damage, it is preferable to have the short-circuiting section secured in position ingeniously by, for example, firmly soldering it to the pattern of the ground 67 on the printed circuit board 10 to establish a firm conductive connection with the pattern, securing it by a cushion to establish stable contact therebetween, or forming it using elastic material.

Figure 21:
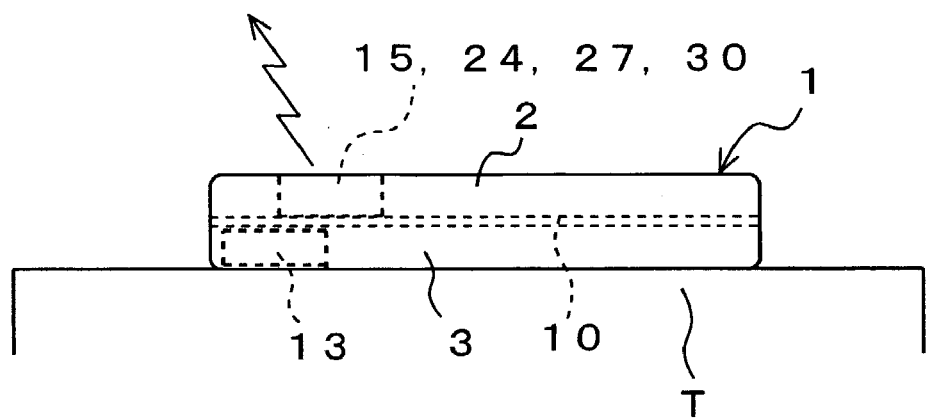
FIG. 21 is a side view of the portable wireless communication terminal device 1 for explaining a condition of the device placed on a table.

FIG. 21 is a side view of the portable wireless communication terminal device for explaining a condition where it is placed on a desk. When the portable wireless communication terminal device 1 is placed on a table with the control keys 7 side thereof oriented upward while it is on standby state or data communication state, as shown in FIG. 21, a table T shuts off the electromagnetic waves transmitted to and received from the first built-in antenna 13. Even then, the electromagnetic waves transmitted to and received from the second built-in antennas 15, 24, 27, 30 are not shut off by an obstacle.

Accordingly, this terminal device do not lessen communication quality as compared with conventional terminal devices that have only the first built-in antenna 13, thereby maintaining antenna characteristic and communication quality with good stability.

Figure 22:
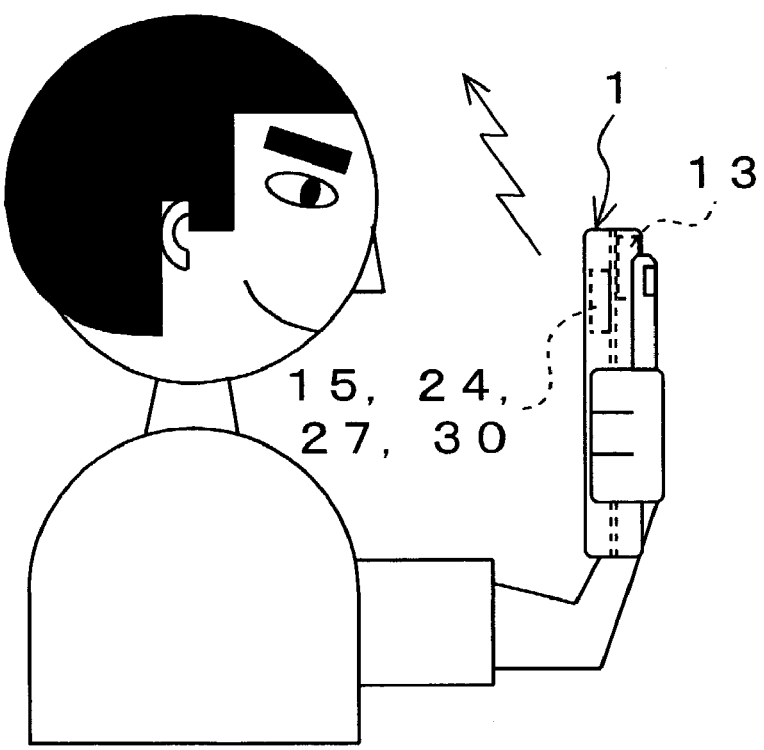
FIG. 22 is a diagram for explaining a condition where a user holds the portable wireless communication terminal device 1 and looks at the LCD 12 of the device 1.

FIG. 22 is a diagram for explaining a condition where a user holds the portable wireless communication terminal device and looks at the LCD 12 of the device. In this case, the electromagnetic waves transmitted to and received from the second built-in antennas 15, 24, 27, 30 are not shut off by an obstacle even when the user put his fingers on a section corresponding to the first built-in antenna 13 while the user holds the portable wireless communication terminal device 1 and looks at the LCD 12, as shown in FIG. 22.

Since the first built-in antenna 13 is set on the back side of the terminal device and each of the second built-in antennas 15, 24, 27, or 30 is set on the front side thereof, the electromagnetic waves transmitted to and received from the second built-in antennas 15, 24, 27, 30 are not shut off by an obstacle even when the portable wireless communication terminal device 1 is placed on the table with the control keys 7 and the LCD 12 oriented upward while it is on standby state, data communication state or the like, or even when the user puts his or her fingers on a section corresponding to the first built-in antenna 13 while the user holds the portable wireless communication terminal device 1 and looks at the LCD 12. Accordingly, this terminal device do not lessen communication quality as compared with conventional terminal devices that have only the first built-in antenna 13, thereby maintaining stable antenna characteristic and stable communication quality.

Next, a portable wireless communication terminal device 35 according to the second embodiment of the invention will be described. FIG. 23A is a perspective view of a configuration of the portable wireless communication terminal device 35 according to the second embodiment thereof. FIG. 23B is a sectional side view thereof. FIG. 23A shows an unfolded condition of the portable wireless communication terminal device 35. The device has two casings, a first upper casing 36 and a second lower casing 37. Each of the two casings, the upper and lower casings 36 and 37, is formed of molded members, for example, made of synthetic resin, and has similar, generally rectangular, panel configuration. They are rotatably connected with a hinge section 38 so as to be folded or unfolded.

That is, the portable wireless communication terminal device 35 is formed as a flip phone. A speaker 39 and an LCD 40 are mounted on the upper casing 36. A microphone 41 and a keyboard 42 are mounted on the lower casing 37.

As shown in FIG. 23B, the casings 36 and 37 have respective built-in printed circuit boards 43 and 45. The upper casing 36 has a configuration similar to that of each the upper sections of the panels 2 and 3 as previously described in connection with the first embodiment. That is, a first built-in antenna 47 is disposed on the upper end of the backside of the printed circuit board 43, behind the speaker.

A second built-in antenna 48 is mounted on the periphery of the LCD 40 on the front side of the printed circuit board 43. The first and second built-in antennas 47 and 48 are supplied with power from the printed circuit board 43 via respective feeding sections 50 and 51.

The upper and lower casings 36 and 37, respectively, may be folded into a closed configuration as shown in FIG. 24, by rotating them towards each other about the hinge section 38. FIG. 24 is a perspective view of a configuration of the portable wireless communication terminal device when it is folded.

When the folded portable wireless communication terminal device 35 is placed on a table, for example, as shown in FIG. 24, the second built-in antenna 48 adjacent the LCD 40 is blocked by the lower casing 37, resulting in lessening of antenna characteristic. Consequently, only the first built-in antenna 47 can actually work well.

However, when the portable wireless communication terminal device 35 is open or unfolded as shown in FIGS. 23A and 23B, the first built-in antenna 47 and the second built-in antenna 48 operate without losing their antenna characteristics, maintaining stable communication quality, unless they are blocked by a human body or a table surface on which the device is mounted.

In the embodiment shown in FIGS. 23A and 23B and FIG. 24, described is a configuration that the LCD 40 is set on the upper casing 36 side. However, the invention is not limited to this configuration. For example, the LCD 40 may be set on the lower casing 37 side.

In this way, according to the foldable portable wireless communication terminal device 35 of the invention, the first built-in antenna 47 is set on the backside of the upper casing 36 and the second built-in antenna 48 is set on the front side of the upper casing 36. Therefore, if the portable wireless communication terminal device 35 is placed on the table with the upper casing 36 oriented upward while it is on standby state, data communication state or the like, in a case where the upper and lower casings 36 and 37 are folded (closed), the electromagnetic waves transmitted to and received from the first built-in antenna 47 are not shut off by an obstacle. This allows the portable wireless communication terminal device 35 to maintain stable antenna characteristic and stable communication quality.

On the other hand, when the portable wireless communication terminal device 35 is opened or unfolded, the first and second built-in antennas 47 and 48 can operate without being blocked by a human body or a table surface on which the device is mounted, thereby preventing antenna characteristic thereof from lessening. This keeps stable communication quality.

Further, when the user puts his or her fingers on a section corresponding to the first built-in antenna while he or she holds the portable wireless communication terminal device 35 thus unfolded or opened and looks at the LCD 40, for example, the electromagnetic waves transmitted to and received from the second built-in antenna 48 are not shut off by an obstacle. Accordingly, this terminal device do not lessen communication quality as compared with conventional terminal devices that have only the first built-in antenna 47, thereby maintaining stable antenna characteristic and stable communication quality.

Figure 25:
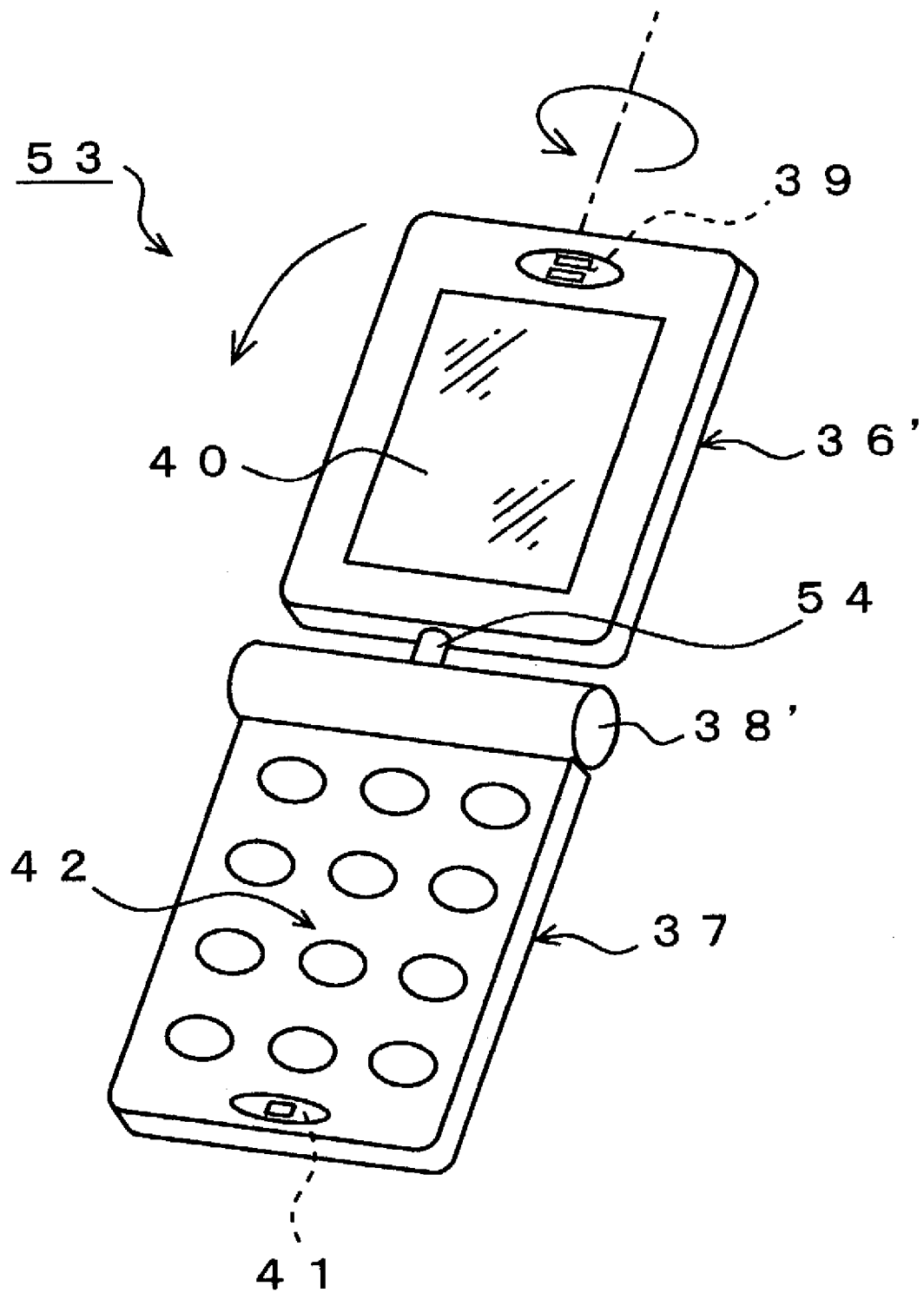
FIG. 25 is a perspective view of a configuration of a portable wireless communication terminal device 53 according to a third embodiment of the invention.

Next, a portable wireless communication terminal device 53 according to the third embodiment of the invention will be described. FIG. 25 is a perspective view of a configuration of the portable wireless communication terminal device 53 as the third embodiment. In the portable wireless communication terminal device 53 as shown in FIG. 25, a pivot 54 is projected from an approximate center of one hinge member of a hinge section 38' to rotatably support at one end thereof the upper casing 36'. The remaining members thereof are the same in structure as those of the portable wireless communication terminal device 35 described above as the second embodiment, and further description will be omitted.

Figure 26:
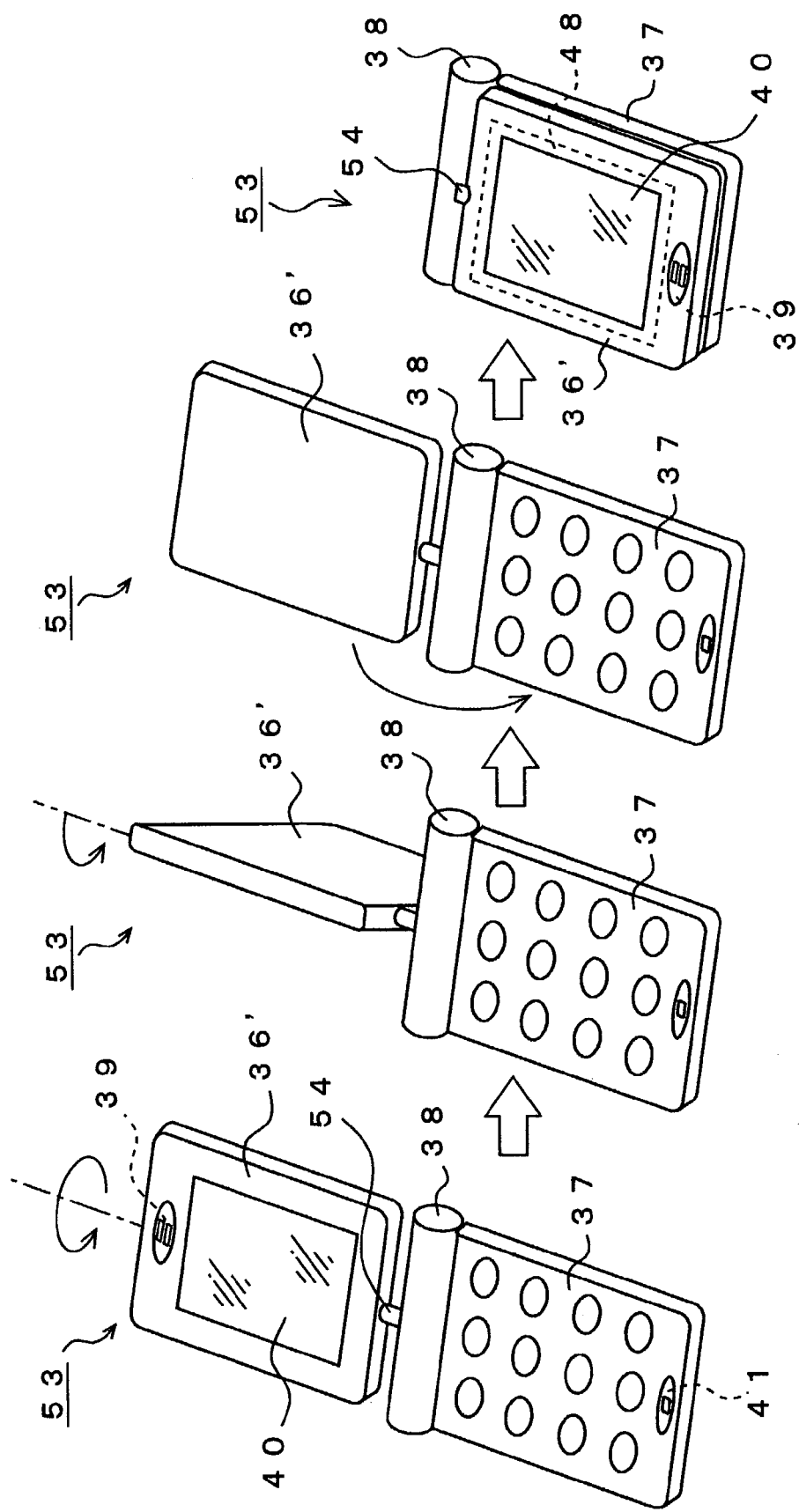
FIGS. 26A–D respectively are perspective views of the portable wireless communication terminal device 53 of FIG. 25, each for illustrating steps (first to fourth steps) of folding the terminal device 53.

Next, steps of folding the portable wireless communication terminal device 53 will now be described. FIGS. 26A–26D are respective perspective views of the portable wireless communication terminal device according to the third embodiment of the invention, each showing how the device can be folded (closed) in accordance with first to fourth steps. First, when the portable wireless communication terminal device 53 is open as shown in FIG. 26A, the upper casing 36' rotates on the pivot 54 through 90 degrees in the clockwise direction. This will bring the upper casing 36' to an upright position as shown in FIG. 26B.

By further rotating the upper casing 36' about the pivot 54 through 90 degrees in the clockwise direction, the upper casing 36' is turned over, as shown in FIG. 26C. Then, under this condition, the upper casing 36' and the pivot 54 are rotated together forward through 180 degrees by rotating the hinge section 38 until they abut against the lower casing 37. The portable wireless communication terminal device 35 is fully folded or closed with the LCD 40 oriented upward, as shown in FIG. 26D.

Regarding this portable wireless communication terminal device 53 having such the structure, its closed use with the LCD 40 oriented forward to make the LCD visible, as shown in FIG. 26D, is more often available. In such occasion, however, if the built-in antenna is set on only the back of the casing, behind the speaker, namely, only the first built-in antenna 47 is set, then the antenna characteristic, and hence the communication quality, of the device would unavoidably lessen with reliability.

In the embodiment shown, however, the second built-in antenna 48 is set on the LCD 40 side and thus, the LCD 40 is so set as to be oriented forward (so as to be visible to the user) irrespective of whether the upper casing 36' is open or closed. This allows the second built-in antenna 48 to be effectively utilized, thereby maintaining its antenna characteristic and communication quality with good stability.

Figure 27:
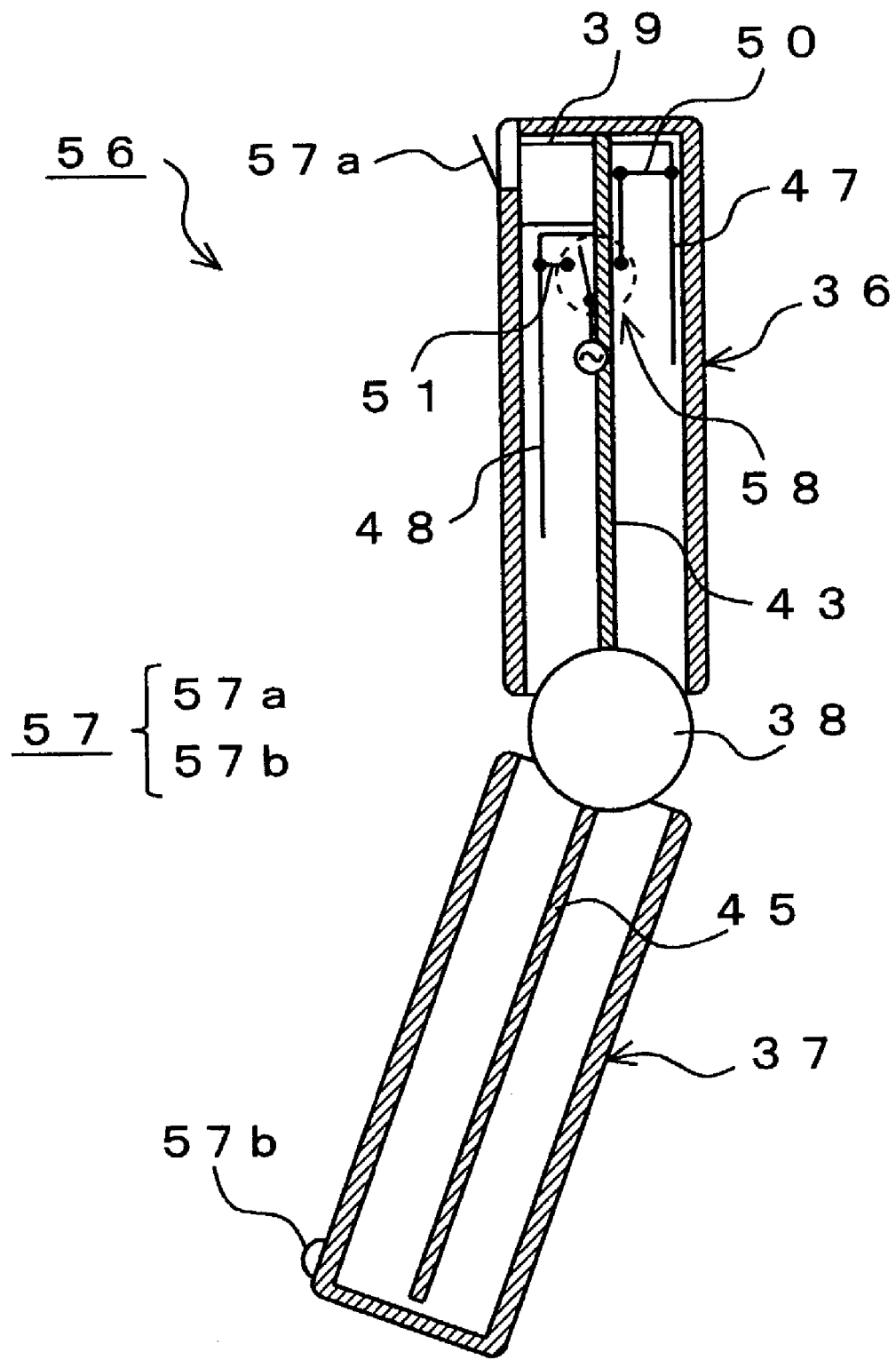
FIG. 27 is a sectional side view of a configuration of a portable wireless communication terminal device 56 according to a fourth embodiment of the invention.

Next, a portable wireless communication terminal device 56 according to the fourth embodiment of the invention will be described. FIG. 27 is a sectional side view of a configuration of the portable wireless communication terminal device 56 as the fourth embodiment.

The portable wireless communication terminal device 56 shown in FIG. 27 has an antenna-switching detection means 57 mounted on outer surfaces of its upper and lower casings 36 and 37, and an antenna selection switch 58 for selectively connecting either the built-in antenna 47 or the built-in antenna 48 to the corresponding feeding section 50 or 51 is provided on the circuit board 43 contained in the upper-casing 36.

This antenna-switching detection means 57 detects an antenna-switching request for switching between the first and second built-in antennas 47 and 48 and sends the detected results to the antenna selection switch 58. According to the antenna selection switch 58, either the first built-in antenna 47 or the second built-in antenna 48 is selected based on the antenna-switching request signal received from the antenna-switching detection means 57, thereby allowing the corresponding antenna to be operated. Except for the antenna selection switch 58, the remaining members are the same as the ones of the portable wireless communication terminal device 35 described above as the second embodiment, as shown in FIGS. 23A and 23B, so that further details of the terminal device 56 will be omitted.

Figure 28:
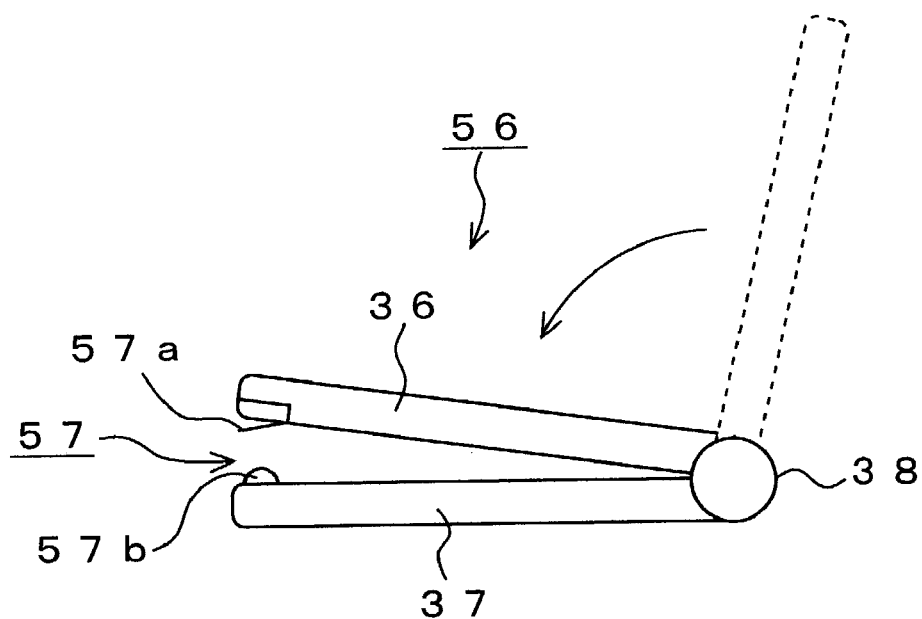
FIG. 28 is a diagram for explaining operations of an antenna-switching detection means 57 of the portable wireless communication terminal device 56 shown in FIG. 27.

FIG. 28 is a diagram for explaining operations of an antenna-switching detection means of the portable wireless communication terminal device 56. The embodiment shown herein is based on the presumption that the casing comprises the upper casing 36 and the lower casing 37, which are connected by the hinge section 38 so as to be foldable, that the antenna-switching detection means 57 detects an antenna-switching request signal corresponding to opening or closing condition of the upper and lower casings 36 and 37, and that the antenna selection switch 58 shown in FIG. 29 selects either one of the first and second built-in antennas 47 and 48 based on the antenna-switching request signal received from the antenna-switching detection means 57, thereby allowing the first built-in antenna 47 or the second built-in antenna 48 to be operated.

The antenna-switching detection means 57 shown in FIG. 28 has a contact point 57a provided at the upper end of the upper casing 36 and another contact point 57b provides at the lower end of the lower casing 37. In the portable wireless communication terminal device 56, as the casings 36 and 37 are fully folded (or closed), the contact points 57a and 57b abut against each other.

When the upper and lower casings 36 and 37 are closed, thereby abutting the contact points 57a and 57b against each other, the antenna selection switch 58 is switched on the basis of the signal thus detected to connect the first built-in antenna 47 to the feeding section 50, thereby setting the first antenna 47 in operation. On the other hand, when the upper and lower casings 36 and 37 are opened, thereby disconnecting the contact points 57a and 57b, the antenna selection switch 58 is switched on the basis of the signal thus detected to connect the second built-in antenna 48 to the feeding section 51, thereby setting the second antenna 48 in operation.

Figure 29:
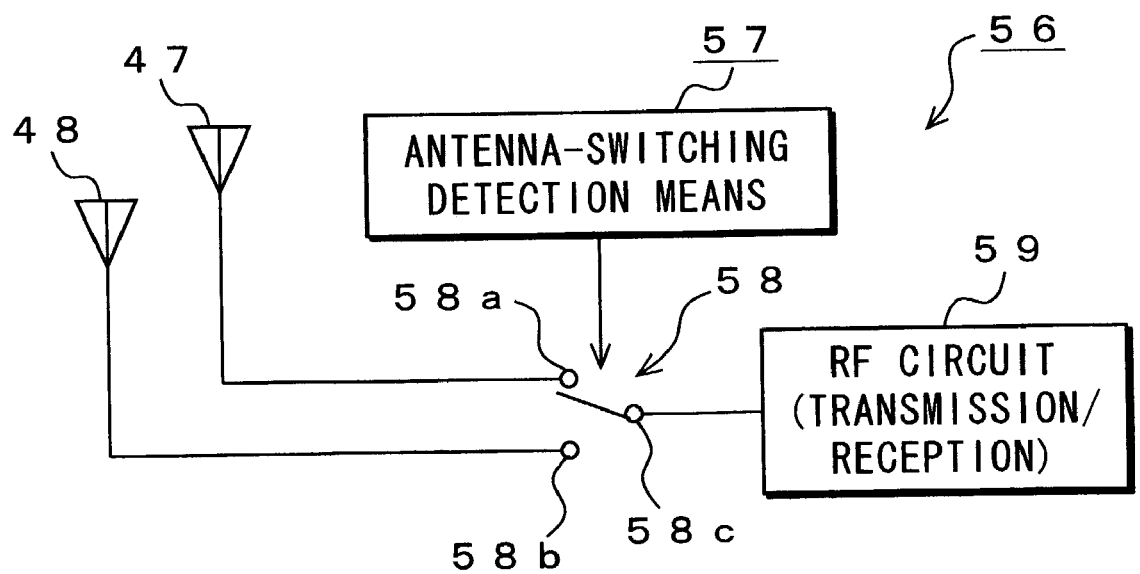
FIG. 29 is a rough block diagram showing a configuration of the portable wireless communication terminal device 56 shown in FIG. 27.

FIG. 29 is a rough block diagram showing a configuration of the portable wireless communication terminal device 56 as the fourth embodiment. The terminal device 56 shown in FIG. 29 has the antenna selection switch 58. The antenna selection switch 58 is provided with a common contact point 58c and opening/closing contact points 58a and 58b. The common contact point 58c is connected to transmission/reception circuit (RF circuit) 59. The contact point 58a is connected to the feeding section 50 of the first built-in antenna 47, while the contact point 58b is connected to the feeding section 51 of the second built-in antenna 48.

In response to a detection signal received from the antenna-switching detection means 57, the common contact point 58c of the antenna selection switch 58 is switched to connect it to either the contact point 58a or the contact point 58b, thereby activating either the first built-in antenna 47 or the second built-in antenna 48.

For example, when the upper and lower casings 36 and 37 are opened as shown in FIG. 28, the contact points 57a and 57b are disconnected. In this case, in response to a first detection signal received from the antenna-switching detection means 57, the common contact point 58c of the antenna selection switch 58 shown in FIG. 29 is connected to the contact point 58b so that the transmission/reception circuit (RF circuit) 59 is connected to the feeding section 51 of the second built-in antenna 48, thereby activating the second built-in antenna 48. Herein, the first detection signal relates to a request to switch from the first built-in antenna 47 to the second built-in antenna 48.

On the other hand, when the upper casing 36 and the lower casing 37 shown in FIG. 28 are closed, the contact points 57a and 57b are in contact with each other. As a result, the common contact point 58c of the antenna selection switch 58 is connected to the contact point 58a in response to a second detection signal received from the antenna-switching detection means 57. Hence, the transmission/reception circuit (RF circuit) 59 is connected to the feeding section 50 of the first built-in antenna 47. This allows the first built-in antenna 47 to be activated. Thus, the second signal relates to a request to switch from the second built-in antenna 48 to the first built-in antenna 47.

Therefore, when the upper and lower casings 36 and 37 of the portable wireless communication terminal device 56 are open, only the second built-in antenna 48 on the LCD 40 side is operable, which allows saving of power. Further, the electromagnetic waves transmitted to and received from the second built-in antenna 48 are not shut off by an obstacle even when the user put his fingers on a section corresponding to the first built-in antenna 47 while looking at the LCD 40, thereby allowing the terminal device to be activated without lessening its antenna characteristic to maintain stable communication quality.

When the upper and lower casings 36 and 37 are fully folded (i.e. closed) during the standby state, data communication state, or the like, only the first built-in antenna 47 on the backside of the casing 36 is activated, so that radiation of the electromagnetic waves transmitted from the second built-in antenna 48 is suppressed. Moreover, the electromagnetic waves transmitted from and received from the first built-in antenna 47 are not blocked by an object, thereby allowing the terminal device to be activated without lessening its antenna characteristic to maintain stable communication quality.

Figure 30:
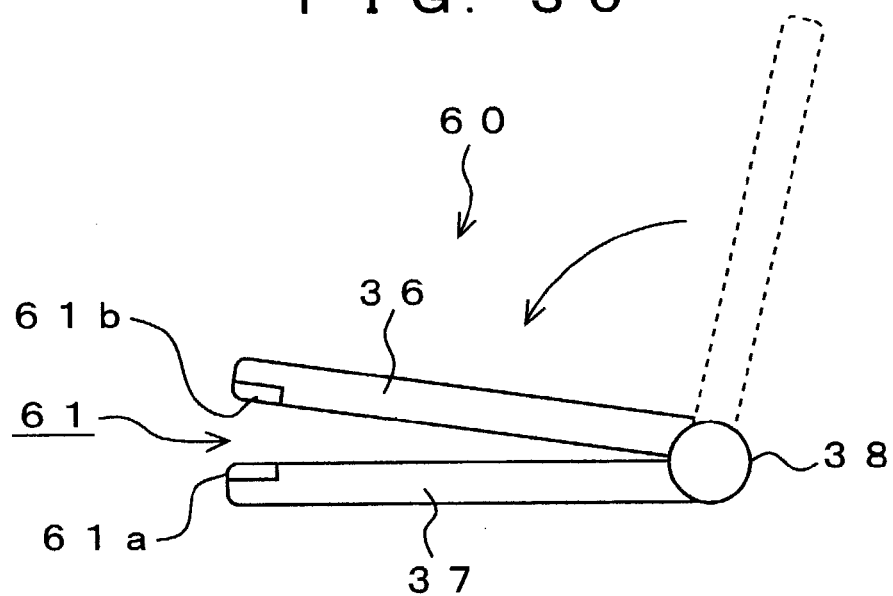
FIG. 30 is a diagram for explaining a configuration of another antenna-switching detection means 61.

FIG. 30 is a schematic diagram for showing a configuration of another antenna-switching detection means 61. The antenna-switching detection means 61 shown in FIG. 30 has a reed switch 61a provided at the lower end of the lower casing 37 and a magnet 61b provided at the upper end of the upper casing 36. In the portable wireless communication terminal device 60, the reed switch 61a and the magnet 61b abut against each other when the upper and lower casings 36 and 37 are closed.

The remaining members are the same as the ones of the portable wireless communication terminal device 56 shown in FIG. 27, so that further details of the terminal device 60 will be omitted. In the terminal device 60, when the upper and lower casings 36 and 37 are closely folded and the reed switch 61a is contacted with the magnet 61b, the reed switch 61a is turned on. In response to this operation, the antenna selection switch 58 is switched to select the first built-in antenna 47 so that it is connected to the antenna 47, thereby causing the first built-in antenna 47 to be activated.

On the other hand, when the upper and lower casings 36 and 37 are unfolded (opened) and the reed switch 61a and the magnet 61b is disconnected, the antenna selection switch 58 is switched to select the second built-in antenna 48 so that it is connected to the antenna 48. This switching activates the second built-in antenna 48. Hence, the antenna-switching detection means 61 provides the same function as that of the antenna-switching detection means 57 as described previously in connection with FIGS. 20 and 29.

Figure 31:
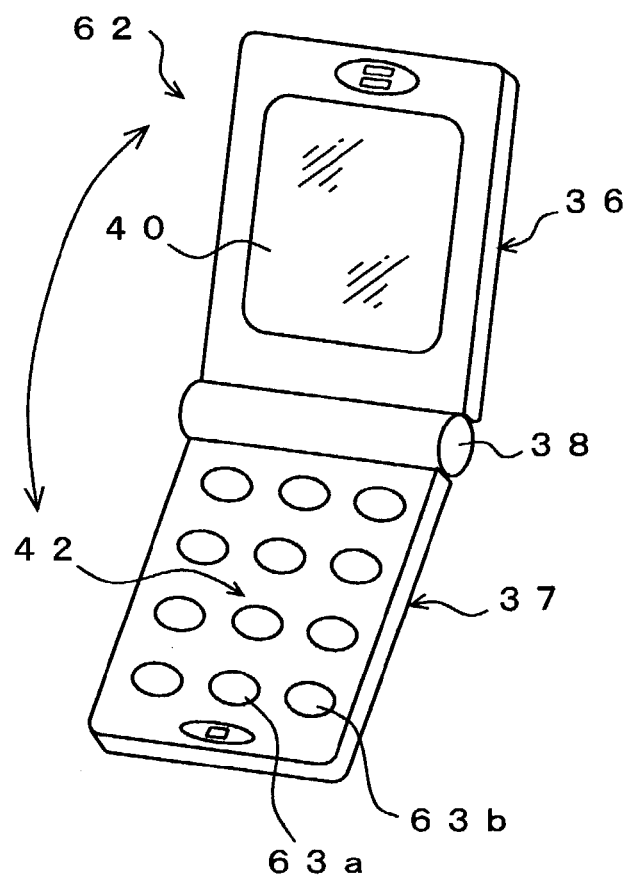
FIG. 31 is a perspective view of a configuration of an antenna-switching detection means in accordance with a portable wireless communication terminal device 62.

FIG. 31 is a perspective view showing a configuration of further antenna-switching detection means. The portable wireless communication terminal device 62 shown in FIG. 31 has a keyboard section 42. The keyboard section 42 is provided with a data communication mode button 63a and a telephone mode button 63b, both buttons serving as the antenna-switching detection means.

The antenna selection switch 58 may be constituted of a circuit using, for example, diodes, field effect transistors (FETs), and other transistors. A control signal generated by pressing either the data communication mode button 63a or the telephone mode button 63b is sent to the antenna selection switch 58. That is, the user can switch from the first antenna to the second antennas and vise versa, as he wishes. The control signal is a signal requesting switching the second built-in antenna 48 to the first built-in antenna 47 or a signal requesting switching the first built-in antenna 47 to the second built-in antenna 48. The remaining members are the same as the ones of the portable wireless communication terminal device 56 shown in FIG. 27, so that further details of the terminal device 62 will be omitted.

In the portable wireless communication terminal device 62, by pressing the telephone mode button 63b, the antenna selection switch 58 is switched to select the second built-in antenna 48 set on the LCD 40 side in response to the control signal thereof so that it is connected to the second built-in antenna 48. Therefore, the electromagnetic waves transmitted to and received from the second built-in antenna 48 are not blocked by an obstacle. Thus, the terminal device operates without lessening its antenna characteristic, thereby maintaining stable communication quality.

If the user presses the telephone mode button 63b when he or she holds the portable wireless communication terminal device 62 at his ear, the antenna selection switch 58 is switched to select the first built-in antenna 47 on the backside of the upper casing 36 in response to the control signal thereof so that it is connected to the first built-in antenna 47. In this mode, only the first built-in antenna 47 operates while the second built-in antenna 48 does not operate as antenna. Therefore, the electromagnetic waves transmitted to and received from the first built-in antenna are not blocked by an obstacle. As a result, stable communication quality may be maintained. Furthermore, since the second built-in antenna 48 is not in operation, radiation from the second built-in antenna 48 placed adjacent user's head is suppressed, thereby facilitating reduction of specific absorption rate (SAR, the amount of radiation energy absorbed by specified parts of human body, which represents power per unit time or unit mass) at so-called talking position Although the invention has been described with reference to preferred first to fourth embodiments in which display means is an LCD (12 or 40), it will be apparent that the display means can be replaced by any alternative one such as an electroluminescent display.

INDUSTRIAL APPLICABILITY

The invention is extremely suitable for use in stick-type and foldable portable wireless communication terminal devices having a data communications function and a telephone function.

The invention claimed is:

1. A portable wireless communication terminal device having a data communication function and, a telephone function, comprising:
a casing;
display means having a display section exposed through an opening of said casing;
a circuit board installed in said casing and having said display means arranged on a first surface of the circuit board;

a first antenna electrically connected to said circuit board and disposed on a second surface of the circuit board opposite to the display section of said display means; and a second antenna electrically connected to said circuit board and mounted on a periphery of said display section of said display means, wherein said second antenna has an inverted-F type antenna structure, said second antenna including:

a radiative conductor;

a ground facing said radiative conductor;

short-circuiting means for connecting said radiative conductor to said ground; and feeding means for feeding electric power to said radiative conductor.

2. The portable wireless communication terminal device according to claim 1, wherein said display means is a liquid crystal display.

3. The portable wireless communication terminal device according to claim 2, wherein the radiative conductor of said second antenna is mounted on a periphery of a display side of said liquid crystal display.

4. The portable wireless communication terminal device according to claim 1, wherein said casing includes a first and a second casing being foldably connected by a hinge section.

5. The portable wireless communication terminal device according to claim 4, wherein one of said first and second casings is rotatably supported by said hinge section.

6. The portable wireless communication terminal device according to claim 1, further comprising:

antenna-switching detection means for detecting an antenna-switching request requesting selection of one of said first and second antennas, and transmitting a detected result signal; and an antenna selection switch for switching the first and second antennas to operate one of the antennas based on the detected result signal received from said antenna-switching detection means.

7. The portable wireless communication terminal device according to claim 6, wherein said casing has first and second casings that are foldably connected by a hinge section;

wherein said antenna-switching detection means detects an antenna-switching request signal generated in accordance with one of a closed condition of said first and second casings and a open condition of said first and second casings; and wherein said antenna selection switch switches said first and second antennas to operate one of the antennas based on said antenna-switching request signal received from said antenna-switching detection means.

8. The portable wireless communication terminal device according to claim 6, wherein said antenna-switching detection means includes a data communication mode button and a telephone mode button; and wherein said antenna selection switch switches said first and second antennas to operate one of the antennas under pressing operation of one of said data communication mode button and said telephone mode button.

9. A portable wireless communication terminal device having a data communication function and a telephone function, comprising:

a casing;

display means having a display section exposed through an opening of said casing;

a circuit board installed in said casing and having said display means arranged on a first surface of the circuit board;

a first antenna electrically connected to said circuit board and disposed on a second surface of the circuit board opposite to the display section of said display means; and a second antenna electrically connected to said circuit board and mounted on a periphery of said display section of said display means, wherein said second antenna has an inverted-L type antenna structure, said second antenna including:

a linear folded radiative conductor, a ground facing said radiative conductor; and feeding means for feeding electric power to said radiative conductor.

10. The portable wireless communication terminal device according to claim 9, wherein said display means is a liquid crystal display.

11. The portable wireless communication terminal device according to claim 10, wherein the radiative conductor of said second antenna is mounted on a periphery of a display side of said liquid crystal display on the display section side thereof.

12. The portable wireless communication terminal device according to claim 9, wherein said casing includes a first and a second casing being foldably connected by a hinge section.

13. The portable wireless communication terminal device according to claim 12, wherein one of said first and second casings is rotatably supported by said hinge section.

14. The portable wireless communication terminal device according to claim 9, further comprising:

antenna-switching detection means for detecting an antenna-switching request requesting selection of one of said first and second antennas, and transmitting a detected result signal; and an antenna selection switch for switching the first and second antennas to operate one of the antennas based on the detected result signal received from said antenna-switching detection means.

15. The portable wireless communication terminal device according to claim 14, wherein said casing has first and second casings that are foldably connected by a hinge section;

wherein said antennaswitching detection means detects an antenna-switching request signal generated in accordance with one of a closed condition of said first and second casings and a open condition of said first and second casings; and wherein said antenna selection switch switches said first and second antennas to operate one of the antennas based on said antenna-switching request signal received from said antenna-switching detection means.

16. The portable wireless communication terminal device according to claim 14, wherein said antenna-switching detection means includes a data communication mode button and a telephone mode button; and wherein said antenna selection switch switches said first and second antennas to operate one of the antennas under pressing operation of one of said data communication mode button and said telephone mode button.

* * * * *